United States Patent [19]

Poupon et al.

[11] Patent Number: 4,531,188
[45] Date of Patent: Jul. 23, 1985

[54] METHODS FOR AUTOMATIC PROCESSING OF INFORMATION OBTAINED BY WELL LOGGING

[75] Inventors: André Poupon, Paris; Jean-Claude Favard, Fontenay aux Roses, both of France

[73] Assignee: Schlumberger Technology Corporation, Ridgefield, Conn.

[21] Appl. No.: 269,737

[22] Filed: Jun. 2, 1981

Related U.S. Application Data

[63] Continuation of Ser. No. 310,484, Nov. 29, 1972, abandoned.

[51] Int. Cl.³ .................... G06F 15/20; G01V 5/00
[52] U.S. Cl. .................................................. 364/422
[58] Field of Search ............... 364/422; 250/253, 261, 250/262

[56] References Cited

U.S. PATENT DOCUMENTS

| | | | |
|---|---|---|---|
| 3,767,921 | 10/1973 | Jones | 250/261 |
| 4,048,495 | 9/1977 | Ellis | 364/422 X |
| 4,096,385 | 6/1978 | Marett | 364/422 X |
| 4,276,599 | 6/1981 | Timmons et al. | 364/422 |

*Primary Examiner*—Edward J. Wise

[57] ABSTRACT

Method for automatic processing of well logging information in order to determine the clay parameters, the clay content and to calibrate the porosity and density measurement tools.

Among the parameters varying as a function of the presence of clay, at least two indicators are selected. The borehole is divided into intervals and in each one is determined the most argilaceous level and the least argilaceous level and the totality of these points is used to calculate the clay parameters and the clay content.

One application is the determination of oil-bearing strata.

44 Claims, 14 Drawing Figures

METHODS FOR AUTOMATIC PROCESSING OF INFORMATION OBTAINED BY WELL LOGGING

This is a continuation of abandoned application Ser. No. 310,484, filed Nov. 29, 1972.

This invention relates to the automatic processing of measurements made in a borehole.

It has to do with the field of oil prospecting and in particular with the determination of oil-bearing strata and the evaluation of hydrocarbons which can be moved and extracted on the basis of information recorded in exploratory boreholes.

Methods allowing this evaluation by the automatic processing of information recorded by well logging have already been described in pending U.S. Patent Applications: Ser. No. 7,716 filed on Feb. 2, 1970 by C. Clavier et al. and Ser. No. 112,005 filed on Feb. 2, 1972 by Gaymard et al.

The present invention concerns an information processing stage preliminary to those which are described in the two preceding applications, which stage is intended to prepare the information in order to facilitate subsequent processing and to increase the accuracy and the reliability of the results.

The definitions of the terms used are explained in detail in the two earlier applications.

To facilitate comprehension, a simplified explanation of the terms and notations used is given below.

Well logging consists of recording in a continuous manner, as a function of depth, certain values furnished by measuring instruments moved along a borehole.

The recorded information is the following:

(1) the depth Z;

(2) the diameter of the hole measured;

(3) the apparent porosity $\phi_N$ of the formations measured by a neutron emitter and expressed in porosity units p.u.;

(4) the bulk density of a formation $\rho_b$.

If $\rho_{ma}$ is used to designate the density of the matrix, i.e., of the formation assumed to be non-porous, and $\rho_f$ the density of the fluids filling the pores, the measurement of $\rho_b$ makes it possible to obtain an evaluation $\phi_D$ of the porosity by the formula:

$$\phi_D = \frac{\rho_{ma} - \rho_b}{\rho_{ma} - \rho_f} \quad (1)$$

(5) The time $\Delta t$ taken by an acoustic wave to cover a given distance;

This measurement furnished a third estimation $\phi_S$ of the porosity by the formula:

$$\phi_S = \frac{\Delta t - \Delta t_{ma}}{\Delta t_f - \Delta t_{ma}} \quad (2)$$

in which $\Delta t_{ma}$ and $\Delta t_f$ are the times for covering the same distance in the rock constituting the matrix and in the fluid contained in the pores.

(6) the spontaneous potential SP expressed in millivolts;

(7) the natural gamma radioactivity GR expressed in A.P.I. units;

(8) the true resistivity $R_t$ expressed in ohms·M²/m. This resistivity can be obtained either by measuring an induced current, $R_{IL}$, or by measuring a potential difference between two electrodes $R_{LL}$. It furnishes an estimation of a parameter $\phi R_t$ representing the amount of water per unit volume of the formations, by the formula:

$$\phi R_t = \sqrt[n]{\frac{a \cdot R_w}{R_t}} \quad (7)$$

in which n is an exponent taking on values generally between 1.8 and 2.2, and a is a constant coefficient generally between 0.6 and 1. In non-argilaceous water-bearing formations $\phi R_t$ is equal to the porosity.

(9) the resistivity of the zone invaded by the mud filtrate $R_{xo}$ in ohms·m²/m. This is measured through the potential difference two electrodes: $R_{MLL}$.

$S_w$ designates the formation water content of the pores, also called the water saturation, i.e., the ratio of water volume to pore volume. Likewise, $S_{hy}$ designates the liquid or gaseous hydrocarbon content of the pores.

$$S_w + S_{hy} = 1 \quad (3)$$

that is, all the pores are filled with fluid: water, oil or gas.

In the zone near the borehole, which is invaded by the mud filtrate, $S_{xo}$ designates the mud filtrate saturation and $S_{hyr}$ the residual hydrocarbon saturation.

$$S_{xo} + S_{hyr} = 1 \quad (4)$$

$S_{hyr}$ represents the proportion of irretrievable hydrocarbons while the difference $S_{hy}-S_{hyr}$ represents the hydrocarbons which can be moved and extracted.

One of the results sought is the evaluation of the product $\phi \times (S_{hy}-S_{hyr})$ or $\phi \times (S_{xo}-S_w)$ which represents, for each stratum, the proportion of the formation volume occupied by retrievable hydrocarbons.

The presence of hydrocarbons in a formation greatly modifies certain measured parameters, in particular the resistivity, because the resistivity of hydrocarbons is much higher than the resistivity $R_w$ of the formation water.

However, the nature of the minerals constituting the matrix of the rock gives rise to very substantial variations in the measurements, in particular the presence of clay (Cl) in all its forms: colloidal clay or clay loam.

The variations due to the hydrocarbons and to lithological factors can occur in the same or opposite direction so that, to be able to determine with good accuracy which strata contain hydrocarbons and to be able to evaluate the retrievable volume of hydrocarbons, it is first necessary, using the information obtained and combining this information, to determine the lithology of the strata, the clay proportion and the clay and formation water parameters. Then, the parameters thus calculated must be used to calibrate the porosity measuring tools so that the values of porosity $\phi$ given by the different instruments are the same.

In the two earlier patent applications, a description was given of methods for the automatic processing of well logging measurements which required many complex operations using a computer.

The flowcharts of these operations include iterations which are repeated because certain initial items of information are known only approximately.

It is an object of this invention to provide, by means of a preliminary processing, the values of the clay parameters and a calibration of porosity measurements for use as initial data for the programs described in the earlier patent applications.

A primary object of the invention is to provide an automatic method for the processing of measurements recorded by well logging in a borehole, which measurements make it possible to calculate, for each level, parameters which generally have extreme values in the clay.

This method includes the following steps:

selecting, from among the said parameters, at least two clay indicators;

determining, for pre-selected formation intervals by means of the said indicators, the most argilaceous level of each interval;

selecting from all the most argilaceous levels of each interval the best one, called the pivot level; and computing, on the basis of measurements of the pivot level, the clay parameters valid for the entire pivot interval in which is located the said pivot level.

The selection of the pivot level is obtained by the following operations:

calculating all the apparent matrix densities $\rho_{maa}$ of each of the most argilaceous levels of each interval;

determining the largest apparent densities from this set of densities, designated $\rho_{ma\ max}$;

selecting as the pivot level the one which corresponds to $\rho_{ma\ max}$.

The calculation of the clay parameters of the pivot interval includes the following steps:

If the value of $\rho_{ma\ max}$ is higher than a first predetermined limit, for example 3, the clay parameters of the interval are chosen equal to those of the pivot level.

If the value of $\rho_{ma\ max}$ is lower than the said first limit and higher than a second predetermined limit, for example 2.9, the clay proportion in the pivot level is calculated from the apparent matrix density $\rho_{ma}$ of the rocks constituting the said interval which is known and the apparent matrix density of the clay assumed to be equal to the said first predetermined limit, $\rho_{maCl}$ by the linear interpolation formula $$V_{Cl} = \frac{\rho_{ma\ max} - \rho_{ma}}{\rho_{ma\ Cl} - \rho_{ma}} \quad (20)$$

calculating the clay parameters of the interval using the parameters of the pivot level and the known formula relating the clay content $V_{Cl}$ with the parameters and with the known values of these same parameters in the matrix of the rocks of the pivot interval.

To calculate the clay parameters of the intervals other that the pivot interval, the following operations are carried out:

If the value of the apparent matrix density of the most argilaceous level of the said intervals designated $\rho_{mai}$ is higher than the said first predetermind limit and if the difference between $\rho_{ma\ max}$ and $\rho_{mai}$ is small, for example smaller than 0.05, we choose as values of the clay parameters of the said interval the values of the parameters of the said most argilaceous level of the interval.

If the preceding condition is not met, the clay proportion $V_{cli}$ contained in the said most argilaceous level is calculated from the apparent matrix density $\rho_{ma}$ of the rocks of the said interval which is known and the apparent matrix density of the clay $\rho_{ma}$ Cl which is taken equal to the matrix density of the clay of the pivot interval $\rho_{ma\ max}$ if it is higher than the said first limit or equal to the said first limit in the opposite case.

If the clay content is higher than a given limit, for example 0.6, the clay parameters of the interval are calculated as previously for the pivot interval.

The clay parameters of an interval not containing a sufficiently argilaceous level are calculated by interpolating the clay parameters of the intervals situated on either side of the said interval.

In addition to the determination of the clay parameters, the invention makes it possible to calculate an approximate value of the clay content $V_{Cl}$ of each level. To obtain this result, the following procedure is used:

the most argilaceous level is determined in each interval by means of selected clay indicators;

all the measurements of GR for all the most argilaceous levels are noted and the highest values $GR_{max}$ of these measurements are determined;

all the measurements GR for all the least argilaceous levels are also noted and the lowest of the values $GR_{min}$ of these measurements is determined;

from the values $GR_{max}$ and $GR_{min}$ are determined the difference lines of the values of GR in the argilaceous formations, or $GR_{Cl}$ and in the clean formations, or $GR_o$ and an approximate value of the clay content of each stratum Vac is calculated by the formula:

$$V_{aCl} = \frac{GR - GR_o}{GR_{Cl} - GR_o} \quad (5)$$

According to a feature of the invention, whenever the minimum or maximum of the set of values $x_i$ of a parameter x is to be determined, a statistical minimum or maximum is calculated since if the lowest or the highest value of the set is taken it can constitute an aberrant measurement which seriously distorts the subsequent processing.

The values $x_{i1}$ and $x_{i2}$ of the variable are chose as the statistical maximum or minimum such that the majority of the values $x_i$ of the variable are either higher than $x_{i1}$ or lower than $x_{i2}$ without being too far from $x_{i1}$ or $x_{i2}$.

The following procedure is used:

A function F of the absolute value of the difference $x_i - x_j$ is chosen which is a decreasing function of this absolute value, for example:

$$F = \frac{1}{1 + \alpha |x_i - x_j|^n} \quad (6)$$

where $\alpha$ is a positive coefficient and n is an exponent equal to or greater than 1.

For each level i the function $P_{(i)}$ is computed $P_{(i)}$ the sum of the values F when $x_i$ is fixed and $x_j$ takes on successively all the values of the set by assigning to the function F the same sign as that of the difference $x_i - x_j$ if the statistical maximum is sought and a sign opposite that of the difference $x_i - x_j$ if the statistical minimum is sought.

For the statistical minimum and maximum are chosen the values $x_{i1}$ and $x_{i2}$ which make $P_{(i)}$ maximum. When the variable parameter is a clay indicator, the statistical minimum and maximum of the clay proportion are sought. As the values $x_i$ are the values calculated for the indicator, if the indicator is minimum in the clay, it is sufficient to reverse the signs of F indicated above.

According to the present invention, the porosity and density measuring instruments are calibrated by a scale shift and, if necessary, by introducing a sensitivity coefficient.

If the borehole goes through the sufficient thicknesses of low porosity formations such as anhydrite, salt or compact formations such as limestone or dolomite, these are noted and a correction of the measuring instruments is adopted such that the porosity and density readings in these strata are equal to the known theoretical values.

According to the invention, the density measuring instruments are also calibrated by calculating separately the parameter $\phi R_t$ by the formula:

$$\phi R_t = \sqrt[n]{\frac{a \cdot R_w}{R_t}} \qquad (7)$$

$R_w$ is made to vary step by step around an approximate value $R_w'$ and the corrections $d\phi_N$ and $d\rho_b$ to be applied to the porosity measurement $\phi_N$ and to the density measurement $\rho_b$ are also made to vary step by step.

We look for the pair of values:

$R_w = R_{waN}$ and $d\phi_N = A$ which optimizes a function of the difference between $\phi R_t$ and $\phi_{Nc} = \phi_N + d\phi_N$.

Then, the pair of values of $R_w = R_{waD}$ and $d\rho_b = B$ is sought which optimizes a function of $\rho_{bc} = \rho_b + d\rho_b$ and $\phi R_t$. If the two values $R_{waN}$ and $R_{waD}$ are not very different, the pairs of values of $d\phi_N$ and $d\phi_b$ which optimize a function of $\rho_{bc}$ and $\phi_{Nc}$ are sought and the corrections $d\phi_{Nm}$ and $d\rho_{bm}$, to be made in the $\phi_N$ and of $\rho_b$ readings, are chosen as the pair of values which optimize the function and which is the closest to $d\phi_N = A$ and to $d\rho_b = B$.

A description is given below of the various stages of a particular procedure along with operation flowcharts. While the invention could be carried out on an analogue device, it is preferable that it be carried out on an appropriately programmed general purpose digital computer.

Another object of the invention is to provide methods for processing information which defines the series of operations to be carried out whatever the program and the computer used.

The following description refers to the appended drawings in which:

Measurements are acquired for carrying out the analysis described herein by standard well logging techniques which are well known in the art. An example of an apparatus for acquiring the data is shown in the above referenced copending Clavier et al. patent application Ser. No. 7,716 filed on Feb. 2, 1970. As described and shown therein a borehole investigating apparatus traverses a borehole drilled in the earth formation. The apparatus includes exploring devices for obtaining measurements of the bulk density, acoustic travel time, neutron derived porosity, $\phi_N$, natural gamma ray content, diameter of the borehole, spontaneous potential and deep and shallow resistivity, $R_t$ and $R_{xo}$.

Measurement signals derived from the exploring device are transmitted to suitable signal processing circuits located at the surface of the earth. These circuits prepare the signals for application to a digital tape recorder which converts the well logging signals to digital form for recording on magnetic tape. The resulting magnetic tape is either carried to a digital computer or the data contained on the tape transmitted via a telemetry link to a digital computer. The computer is programmed in accordance with the techniques of the present invention to process the data.

Figure 1:
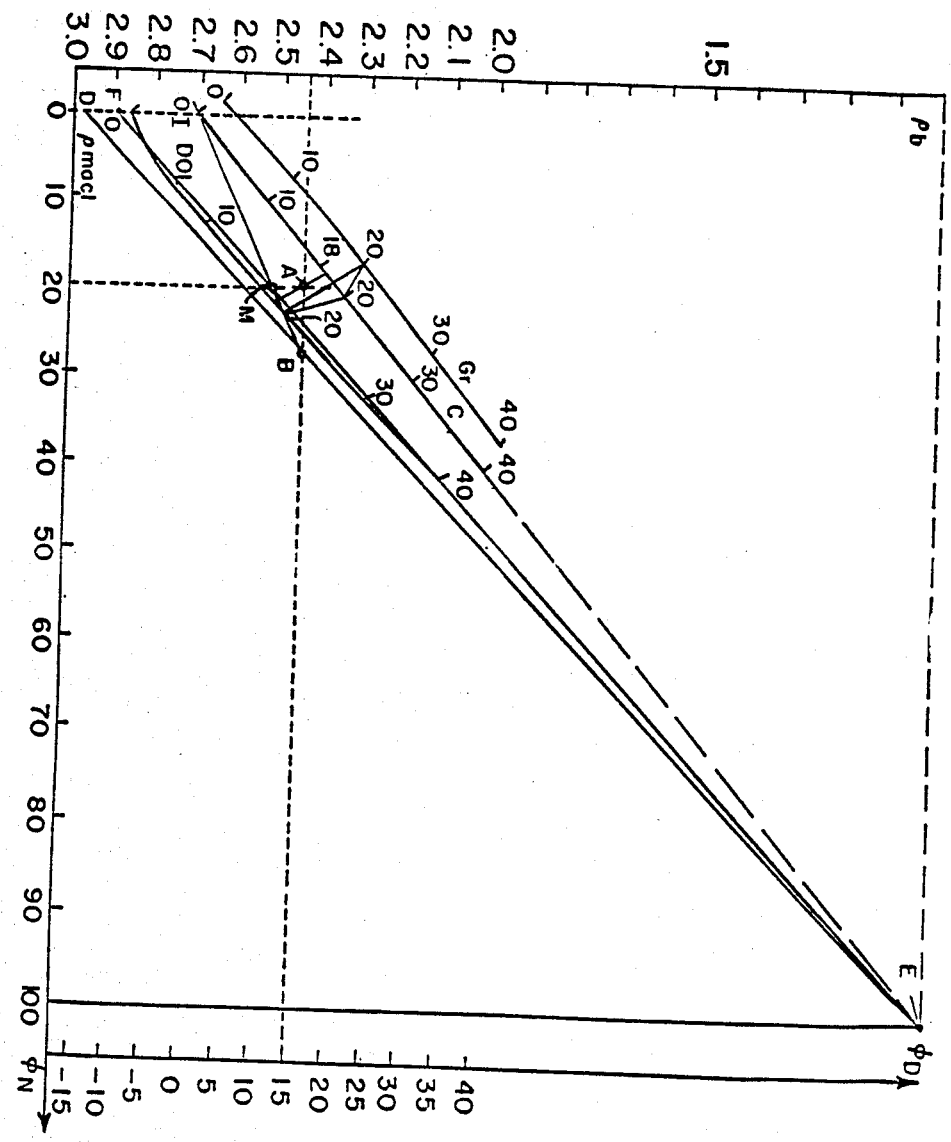
FIG. 1 represents a graphic combination of the measurements of $\phi_N$ and $\phi_D$.

Referring now to FIG. 1 there is shown a diagram in which the abscissas are the measured values of the neutron porosity $\phi_N$ and the ordinates are the values of the porosity $\phi_D$ computed from the density $\rho_b$, the measuring instruments being calibrated in limestone.

In this graph are represented the curves corresponding to the three most frequent matrices: dolomite (Dol), limestone (C) and sandstone (Gr).

Each level is represented on the graph by a point whose abscissas are the measured value of $\phi_N$ and whose ordinate is the measured value of $\rho_b$. All the levels of an interval furnish a cluster of points.

The points corresponding to the limestone levels are grouped along the line (C) for which $\phi_N = \phi_D$ since the measuring instruments are calibrated in the limestone.

The points corresponding to the sandstone levels are grouped along the curve (Gr) and the points corresponding to the dolomite levels are grouped along the curve (Dol). The curves (C), (Gr) and (Dol) are graduated in porosity units.

For a given borehole, the nature of the traversed formations is known as well as the two end matrices, for example, limestone and dolomite if carbonate formations are involved. The apparent densities $\rho_{ma1}$ and $\rho_{ma2}$ of these matrices are read on the diagram at the end of the curves in the neighborhood of $\phi_N = 0$ and the porosities $\phi_{N\ ma1}$ and $\phi_{N\ ma2}$ which correspond to the abscissa of the end of the curves.

Any level is generally a mixture of several matrices with clay and occasionally hydrocarbons and the point which represents it can fall outside of the curves representing the simple matrices. The porosity $\phi_{ND}$ of this level is obtained graphically by plotting one of the lines parallel to the constant porosity lines passing through this point. For example, the level A which $\phi_N = 20$ and $\rho_b = 2.45$ has a porosity $\phi_{ND} = 18.5$.

The calibrations of $\phi_N$ and $\phi_D$ result in shifting the cluster of points representative of all the measurements.

If the only variable factor were the lithological nature of the matrix, all the points of the cluster should be situated between the two curves representing the end matrices.

The methods according to the invention consist of marking, firstly, the low-clay and water-bearing strata and then of calibrating the measurement tools for porosity $\phi_N$ and for density $\rho_b$ so that the maximum of these points, after the shifts due to calibration, are located between those of the two curves (Dol), (C) and (Gr) which correspond to the end matrices present in the borehole.

The point E represents the mud filtrate which in general corresponds to $\rho_b = 1$ and $\phi_N = 100\%$.

The points representative of the clay levels are grouped along a line EB called the clay line. The density corresponding to the point D where the clay line intersects the axis $\phi_N = 0$ is the apparent matrix density of the clay $\rho_{ma\ Cl}$, close to 3 in the figure.

The point B represents a pure clay level having a density $\rho = 2.45$ and a neutron porosity $\phi_N = 0.27$.

The point F, determined by the intersection of the line EM with the $\phi_N = 0$ axis, represents the apparent matrix density of a point M having $\phi_N=0.20$ and $\rho_b=2.55$.

With the point M representative of a level, i, located in an interval in which the matrix of the rocks is composed of limestone, we obtain the clay proportion $V_{Cl(i)}$ in this level through the ratio FI/DI in which I is the point where the line C intersects the axis $\phi_N=0$.

Figure 2:
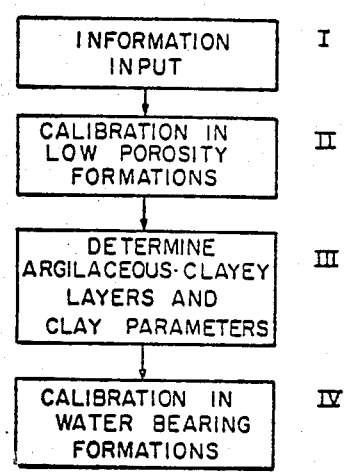
FIGS. 2 to 10 represent the flow charts of the successive information processing operations for implementation on a general purpose digital computer.

FIG. 2 represents the flow chart of the overall operation of the invention. These include four stages:

Stage I: input of information.
Stage II: calibrations in low porosity formations.
Stage III: determination of argilaceous strata and clay parameters.
Stage IV: calibration in water-bearing formations.

Stage I—Input of Information

Figure 3:
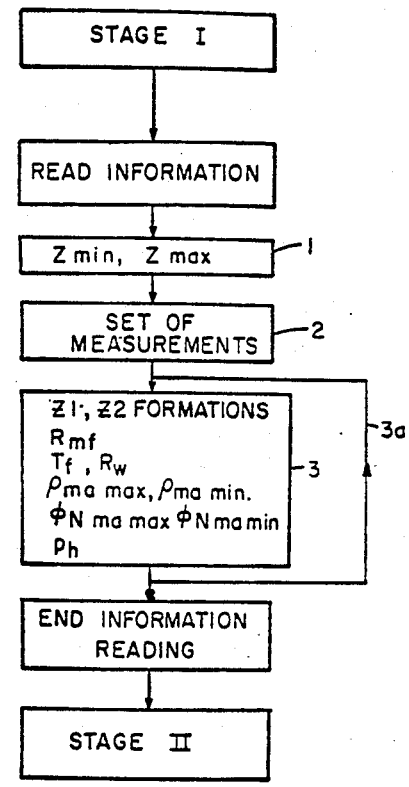

FIG. 3 represents the general flow chart of Stage I: input of information.

A first item of information is the minimum and maximum depth between which falls the borehole length to be studied, in the case where the study must include only one portion of the borehole (block 1).

Block 2 represents the reading of the measurements made in the borehole. These readings have been previously corrected to take into account the diameter of the borehole and the possible presence of a mudcake along the walls.

These corrections are made from nomograms which indicate the variations in the readings brought about by variations in diameter. The measurements made are those which correspond to regularly spaced depth levels for example, every 30 centimeters or every foot.

Block 3 represents the values of the constant parameters which are recorded for each geological stage. The geological stages are determined by a preliminary analysis of the borehole data.

These parameters are:

Z1 and Z2: limit depths of each geological stage previously marked.

T: temperature at different levels.

$R_{mf}$: known mud filtrate resistivity. This resistivity varies with temperature according to the formula:

$$R_{mf} = R_{mfo} \frac{82}{TF + 7} \quad (8)$$

in which $R_{mfo}$ is the resistivity at 75° F. and TF the temperature in degrees Fahrenheit.

$R_w$: resistivity of formation water if known. This resistivity also varies with temperature according to the formula (8).

If $R_w$ is not known with accuracy, we enter an approximated value, $R_{wa}$.

$\rho_{ma1}$ and $\rho_{ma2}$ which are the maximum and minimum matrix densities present in the borehole.

The lithology of the traversed formations is sufficiently known so that these densities can be determined. In general, the clay minerals present, in addition to clay, are sandstone, whose matrix density is about 2.65, or limestone with a density $\rho_{ma}=2.71$ or dolomite with a density $\rho_{ma}=2.87$.

For the sands, the matrix density $\rho_{ma}$ can vary according to their composition: the average density of the sands is entered if it is known.

$\phi_{N\,ma\,max}$ and $\phi_{N\,ma\,min}$ are the matrix porosities read on the neutron probe for the end matrices corresponding to $\rho_{ma1}$ and $\rho_{ma2}$. These values are also known. For the limestone, $\phi_{N\,ma}=0$ because the neutron probe is calibrated for limestone.

For dolomite, $\phi_{N\,ma}=0.5$ p.u.

For quartz sand, $\phi_{N\,ma}=-3$ p.u.

$\rho_h$: density of hydrocarbons. If the type of hydrocarbons present is known, this information can be given. Otherwise, we take $\rho_h=0.7$ for the oil, but the actual values can be much lower in the case of gas.

We also indicate, if they are known, the levels at which are located the major geological contact between two geological stages of a different nature.

Loop 3a indicates that the values of the constant parameters are recorded for each geological stage for the entire borehole length. After the parameters have been recorded, the information reading stage is ended and the program proceeds to Stage II.

Stage II—Calibrations in the low porosity formations

The purpose of this stage is to find the low porosity levels of anhydrite, salt or compact rocks if these exist and to use the readings in these levels to calibrate the porosity measuring instruments.

This stage is divided into two phases:

Phase II$_1$: phase for determining the low porosity levels.
Phase II$_2$: correction of measurements from readings corresponding to the low porosity formations.

Phase II$_1$

Figure 4:
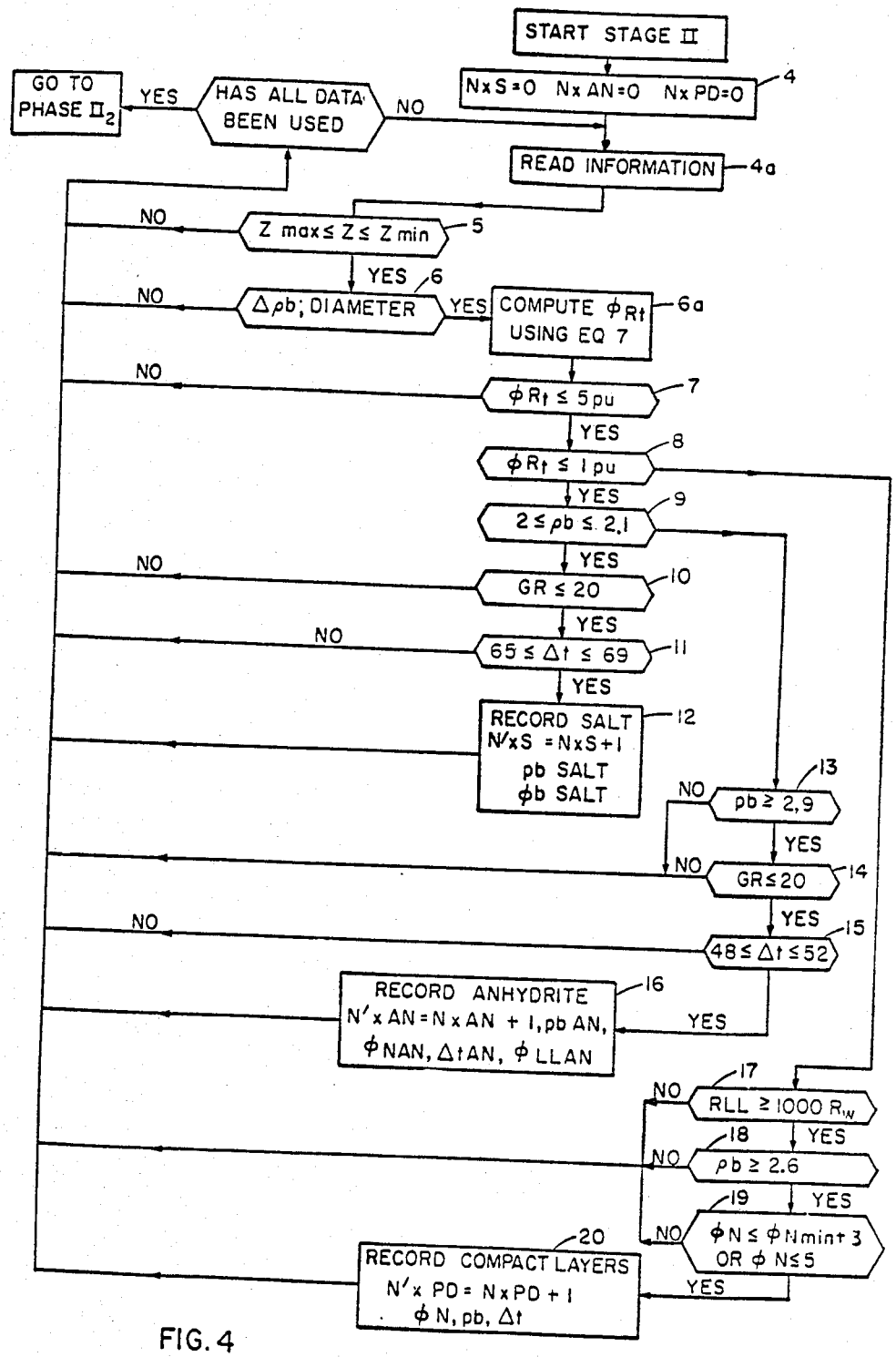

FIG. 4 represents the flow chart of the phase II.

Block 4 represents three indices NxS, NxAN and NxPD which designate the number of levels of salt, anhydrite and of compact formations respectively which have been noted. At the beginning of Stage II, these three indices are set to zero. The stored information is read, block 4a. Then for each item of information, we first determine whether the depth level is in the geological stage, i.e., whether the depth Z is between $Z_{max}$ and $Z_{min}$ (block 5). If the depth level is outside the geological stage, it is first asked if all the data has been used, and if it has not, the information from the next geological stage is read and the depth level is processed using the information from the proper geological interval.

If the depth level is within the geological stage, doubtful information is eliminated by cutting out all readings which correspond to levels in which the diameter exceeds a certain limit or to levels in which the parameter $\Delta\rho_b$, which is recorded at the same time as the density $\rho_b$ shows a measurement which is likely to have an error (block 6).

Next, $\phi R_t$ is computed using Eq. 7 (block 6a). We determine whether $\phi R_t$ is lower than 5 porosity units. If such is not the case, we go on to the next level. If such is the case, we determine whether $\phi R_t \leq 1$ (block 8). In the affirmative, the corresponding level can be salt or anhydrite.

We determine whether it is salt by successively checking whether the measured density $\rho_b$ is between 2 and 2.1 (block 9), whether the measured raidoactivity $GR \leq 20$ (block 10) and whether the acoustic travel time $65 \leq \Delta t \leq 69$ (block 11). If these conditions are all met, it can be concluded that a salt level is involved. In this case, we increase the index NxS by one unit and store the density and the porosity measured for this level, which correspond to the parameters of the salt: $\rho_b$ salt and $\phi_N$ salt (block 12). If the density $\rho_b$ is not between 2 and 2.1, NO answer from decision element 9, we determine whether an anhydrite stratum is involved, i.e., whether simultaneously $\rho_b \leq 2.9$ (block 13), $GR \leq 20$ (block 14) and $48 \leq \Delta t \leq 52$ (block 15). If the answer to these three questions is affirmative, it is concluded that an anhydrite level is involved.

The index NxAN is increased by one unit and the corresponding measurements $\rho_{bAN}$, $\phi_{NAN}$, $\Delta t_{AN}$ and $\phi R_{tAN}$ which represent a measurement in the anhydrite (block 16) are stored.

If the block 8 has determined that $\phi R_t$, while being lower than 5, was higher than 1, we determine whether the level is a compact formation such as limestone or dolomite. Such formations exhibit a high resistivity, higher than 1000 times $R_w$ and a total density $\rho_b \leq 2.60$.

Blocks 17 and 18 determine whether these two conditions are verified simultaneously.

If the numbers of levels available is relatively limited, we conserve all the levels for which the porosity measured by the neutron probe $\phi_N \leq 5$ p.u.

If, on the other hand, many measurements are available, corresponding to compact formations, we make a more severe selection and retain only the levels for which the porosity $\phi_N$ is less than or equal to ($\phi_N$ $min+3$), $\phi_{N\,min}$ being the lowest of the porosity values measured, which can be negative (block 19).

An index NxPD is increased by one unit if all the conditions are met (block 10). The measured values of $\phi_N$, $\rho_b$ and $\Delta t$ are also recorded.

Phase II$_1$ is pursued until all the data are used and then the program proceeds to Phase II$_2$.

Phase II$_2$

Figure 5:
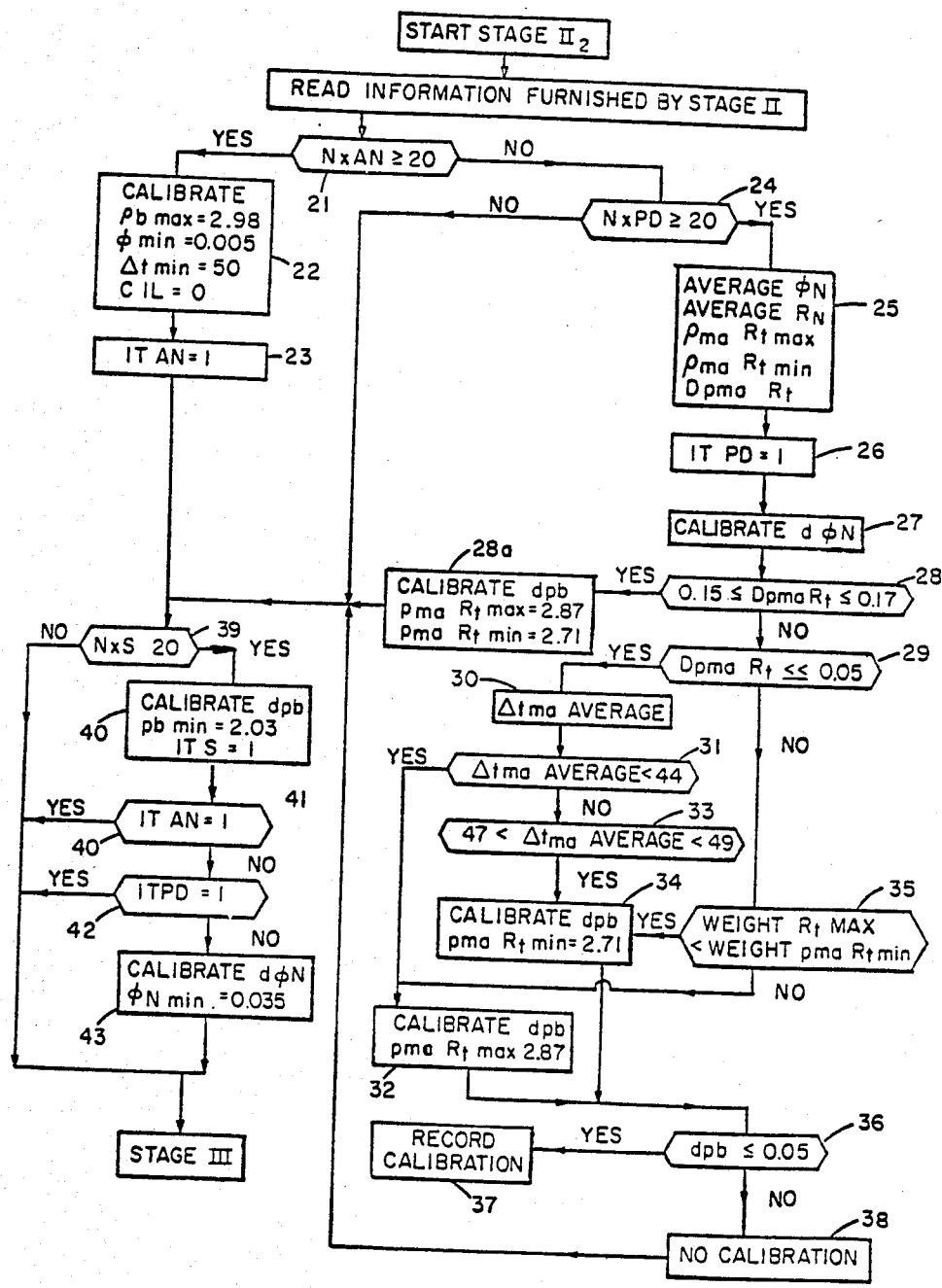

FIG. 5 represents the flow chart of this phase which is designed to calibrate the porosity and density reading instruments from the information obtained in the low porosity levels which have been marked and recorded during the phase II$_1$.

Block 21 determines whether the number of anhydrite levels is sufficient to lead to statistically valid results, for example greater than 20.

If such is the case, a first correction of the measurement instruments is carried out.

We determine the statistical maximum $\rho_{b\,max}$ of all the values of $\rho_b$ measured in the anhydrite levels and we make a scale shift $d\,\rho_b$ of the measurements of $\rho_b$ so that $\rho_{b\,max} = 2.98$ which is the correct reading of the anhydrite.

Likewise, we calculate the statistical minimum $\phi_N$ $min$ of all the porosity measurements made with the neutron probe for all the anhydrite levels and we adopt a calibration $d\phi_N$ of $\phi_N$ such that $\phi_{N\,min} = -0.005$.

We also calibrate the instrument measuring the acoustic travel time $\Delta t$ so that the statistical minimum $\Delta t_{min}$ of all the values measured in the anhydrite strata becomes equal to 50 after a scale shift $d\,\Delta t$.

If the borehole has gone through a thick zone of anhydrite, for example at least of 3 meters thick, i.e., having at least 10 successive measurements noted as corresponding to anhydrite, we note the value of the conductivity, CIL, measured by the induction probe or the average of the conductivity values and, if the difference between the diameter of the borehole and the diameter of the drill bit is smaller than 2 inches, we make an origin shaft $d$ CIL such that $CIL + d\,CIL = 0$.

All these operations are represented in the flow chart by block 22.

In general technique for finding the statistical maximum of a parameter is to find or compute the maximum of the function:

$$P_{(i)} = \Sigma \frac{\sin(i,j)}{1 + \alpha|x_i - x_j|^n}$$

where $\alpha$ is a postive coefficient and n is a positive exponent, for example 2. The subroutine for performing this operation is shown in FIG. 5a.

Figure 5A:
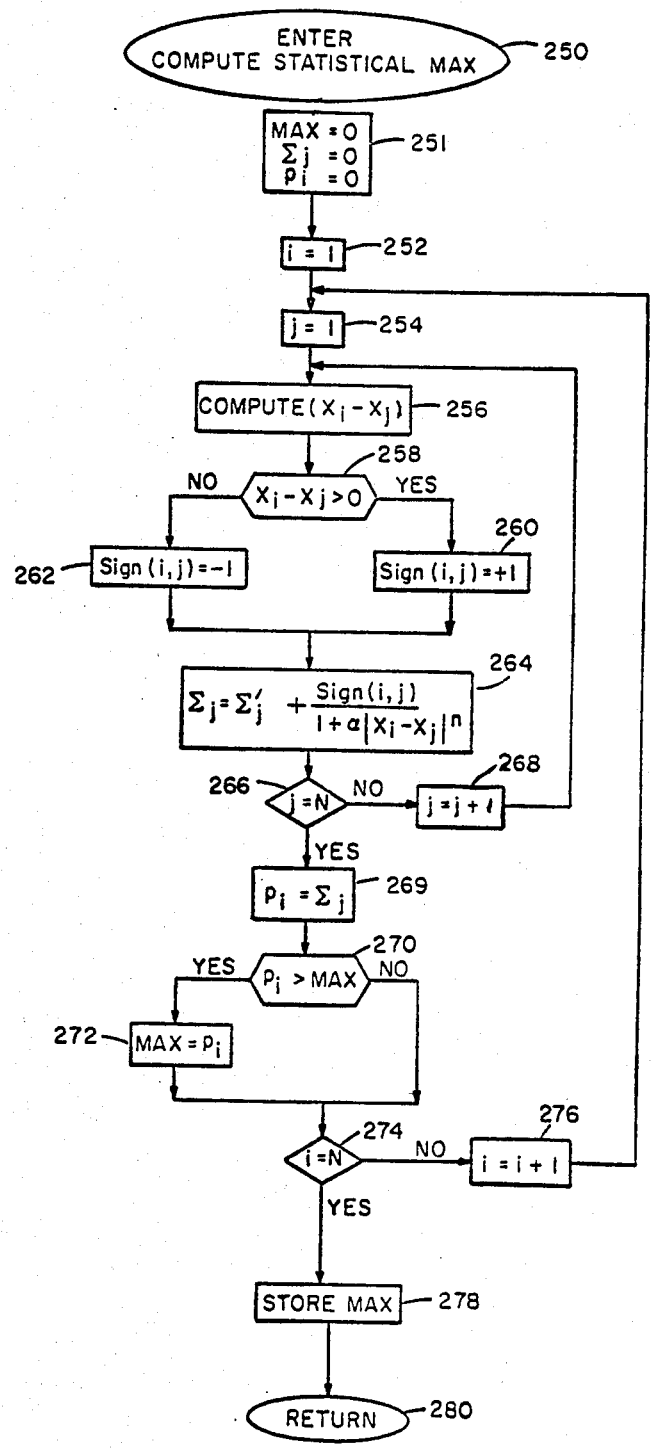

Referring to FIG. 5a, the subroutine is entered, block 250 and the parameters MAX, $\Sigma_j$ and $P_i$ are initially set to 0, block 251. MAX represents the maximum computed value of the function $P_i$ and $\Sigma_j$ is the running sum of the function $P_i$.

The first depth level is considered by setting i and j equal to 1, block 252 and 254. Then, the difference in the value of the parameters at depth levels i and j which are indicated by $x_i$ and $x_j$ respectively, is computed, block 256 after which decision element 258 asks if this difference is equal or greater than 0. If it is, sign (i,j) is set equal to $+1$, block 260 and if not, sign (i,j) is set equal to $-1$, block 262. The function $$\frac{\sin(i,j)}{1 + \alpha|x_i - x_j|^n}$$

can now be computed for the levels corresponding to i and j and added to $\Sigma_j'$ which is the sum of the functions computed for the previous j levels. This is indicated in block 264. Next, decision element 266 asks if j=N, i.e., if all the levels j have been considered, and if not, j is incremented block 268 while i remains constant for the next computation. After all N levels have been considered by incrementing j and maintaining i constant, $P_i$ is set equal to the sum of the function computed in block 264, as represented by block 268. Next decision element 270 asks if $P_i$ is greater than MAX and if it is, MAX is set equal to $P_i$, block 272. Decision element 274 next asks if i equals N, that is if i has been varied over all N depth levels of interest. If not, i is incremented, block 272 and the program returns to consider the next i depth level with all j depth levels. This continues until all the depth levels have been considered after which the maximum value $P_i$ equal to MAX for the entire computation is taken as the statistical maximum value of the parameter of interest, block 278 and the program returns, block 280.

To compute the statistical minimum of a parameter, the same procedure is followed except that the value sign (i,j) is taken as opposite that of the difference $(x_i - x_j)$. Thus in flow chart of FIG. 5a, after decision element 258, sign(i,j) would be set equal to $+1$ if $(x_1 - x_j)$ is less than zero and sign(i,j) would be set equal minus one if $(x_i - x_j)$ is equal to or greater than zero.

Block 23 indicates that the value 1 is given to an index $IT_{AN}$ indicating that a calibration was made in the anhydrite.

If the response of the block 21 is negative, the total thickness of anhydrite is insufficient for a valid calibration, and the block 24 determines whether the number of compact levels detected NxPD is sufficient, for example higher than 20.

If affirmative, block 25 indicates the calculations carried out.

We calculate the average value of all the porosity measurements $\phi_N$ obtained by the neutron probe in the compact formations. We also calculate, for each compact formation, a porosity value $\phi R_t$ from the resistivity measurement $R_t$ and an approximate value of $R_w$ by the formula (7) with, for example, n=2.15 and a=0.62 and we determine the average of all these values $\phi_{Rt}$. For each compact stratum, we calculate the matrix density $\rho_{ma} R_t$ from the total density measurement $\rho_b$ and from the calculated value of $\phi R_t$ by the formula:

$$\rho_{ma} R_t = \frac{\rho_b - \phi R_t \cdot \rho_f}{1 - \phi R_t} \qquad (9)$$

which formula is derived from the formula (1) by replacing $\phi_D$ by $\phi R_t$.

We then determine the statistical maximum $\rho_{ma}R_t$ max and and statistical minimum $\rho_{ma}R_t$ min of all these values of $\rho_{ma}R_t$ and we calculate the range of variations D $\rho_{ma}R_t = \rho_{ma}R_t$ max $- \rho_{ma}R_t$ min.

Block 26 indicates that an index $IT_{PD} = 1$ is recorded indicating that a calibration is made in the compact levels.

Block 27 indicates that a calibration d $\phi_N$ is made on the neutron probe.

The scale shift d $\phi_N$ is taken equal to the difference between the average value of $\phi R_t$ and the average value of $\phi_N$ in the compact formations so that the average of the measurements of $\phi_N$ after correction becomes equal to the average of the values of $\phi R_t$.

Before calibrating the density measurement instrument, block 28 determines whether the variation range D $\rho_{ma}R_t$ is between 0.15 and 0.17. These limits correspond to the difference between the matrix densities of the dolomite and of the limestone which is 0.16.

If the response of block 28 is affirmative, we deduce that compact formations contain levels of limestone and levels of dolomite in the pure state.

Block 28a indicates that we then carry out the calibration of the measuring instrument for the density $\rho_b$ by shifting the scale by a quantity $d\rho_b$ such that $\rho_{ma}R_t$ max is equal to 2.87, i.e., to the density of the dolomite. Simultaneously, $\rho_{ma}R_t$ min becomes equal to 2.71 since D $\rho_{ma}R_t$ is essentially equal to 0.16.

If the response of block 28 is negative, block 29 determines whether D $\rho_{ma}R_t$ is small, for example smaller than 0.05.

If the response is affirmative, the compact formations are composed of a single mineral: limestone or dolomite.

To determine the nature of this mineral, it is necessary to measure the acoustic travel time $\Delta t$ from which we determine the acoustic travel time in the matrix $\Delta t_{ma}$ by the formula:

$$\Delta t_{ma} = \frac{\Delta t - \phi_{Nc} \cdot \Delta t_f}{1 - \phi_{Nc}} \qquad (10)$$

in which formula $\Delta t_f$ is the known acoustic travel time in the fluid which fills the pores and $\phi_{Nc}$ indicates the corrected value of the porosity measurement by the neutron probe.

Block 30 indicates the calculation of the average value of all the values of $\Delta t_{ma}$ in the compact formations. Block 31 determines whether the average $\Delta t_{ma}$ is smaller than 44. If it is, the compaction formations are dolomite.

Block 32 indicates that the density measuring instrument must be calibrated using a correction d $\rho_b$ such that $\rho_{ma}R_t$ max=2.87.

If the response of block 31 is negative, block 33 determines whether the average value of $\Delta t_{ma}$ is between 47 and 49. If it is, the compact formations are limestone strata. Block 34 indicates that the density measuring instrument must be calibrated using a correction d $\rho_b$ such that $\rho_{ma}R_t$ min=2.71.

Coming back to block 29, a negative response means that the compact formations are composed of mixtures of limestone and dolomite.

The function of block 35 is to determine whether the limestone or the dolomite are predominant in this mixture. To accomplish this, the respective weights of the statistical maximum and minimum of $\rho_{ma}R_t$ are compared.

If the limestone is predominant, the histogram of the values of $\rho_{ma}R_t$ exhibit an accumulation in the neighborhood of the statistical minimum whereas this accumulation is located in the vicinity of the statistical maximum if the dolomite is predominant.

To differentiate these two cases, we assign to the statistical minimum and maximum a weight function:

$$P = \sum_{xil - 0.03}^{xil + 0.03} R(xi) \qquad (11)$$

in which xil is the statistical minimum or maximum of all the values of $\rho_{ma}R_t$ and R is the ordinate of the histogram, i.e., the frequency of the values. The function P thus corresponds to the integration of the histogram over an interval 0.03 wide on either side of the statistical minimum and maximum.

If block 35 determines that the weight of $\rho_{ma}R_t$ max is lower than that of $\rho_{ma}R_t$ min the matrix of the compact formations is composed mainly of limestone and the measurement of $\rho b$ is calibrated in the limestone (block 34).

If, on the other hand, the weight of $\rho_{ma}R_t$ max is higher than that of $\rho_{ma}R_t$ min, then the matrix of the compact formations is composed mainly of dolomite and the measurement of $\rho_b$ is calibrated in the dolomite (block 32).

Before recording the correction $d\rho_b$ of the density measurement determined by block 32 or block 34, the block 36 determines whether this correction is smaller than 0.05. If it is, the correction is recorded (block 37).

By contrast, if $d\rho b \leq 0.05$, it is concluded that the value is too high and that an error is to be feared.

In this case, the calibration in the compact formations is rejected (block 38) and the operations are pursued working with the salt levels.

If the response of block 24 is negative, or after having carried out the calibrations in the anhydrite levels and/or in the compact formations, block 39 determines whether the number of salt levels is sufficient. If the reply is affirmative, a correction d $\rho_b$ is made in the density measuring instrument so that the statistical minimum $\rho_b$ obtained in the salt is equal to the correct reading for the salt, or 2.03. The index ITS is given the value 1 to indicate that a correction has been made in the salt (block 40).

In the case where the borehole traverses both anhydrite and salt, we thus obtain a double calibration of the measurements of $\rho_b$ at the two ends of the scale. If these two calibrations are identical, it is then sufficient to make a scale shift. On the other hand, if they do not correspond, it is necessary to introduce at the same time a multiplying coefficient C or a sensitivity coefficient for the measurements of $\rho_b$ so that they correspond and, in this case, the calibration of the density measuring instrument is finished.

Block 41 determines if there has already been a calibration in the anhydrite, in which case we go on to Stage III.

Block 42 also determines whether a calibration has been made in the compact formations, in which case we do on to the next stage.

On the other hand, if no calibration has been made in the anhydrite, nor in the compact formations, we determine the statistical minimum $\phi_{N\,min}$ of all the values of $\phi_N$ measured by the neutron probe in the salt levels and we make a correction d $\phi_N$ such that $\phi_{N\,min}=0.035$ (block 43).

Stage II is then finished.

Summarizing, during this stage, we have calibrated the measuring instruments for porosity, density and possibly for acoustic travel time by shifting the zero of the scale.

If both anhydrite and salt exist in a sufficient thickness, the density calibration is completed and the only remaining calibration unknown is a multiplying factor of the porosity measurements by the neutron probe.

Stage III - Determining clay levels and clay parameters

Clays do not have specific properties which can be measured by logging making it difficult to detect the very argilaceous levels and to obtain the clay parameters.

To identify the clay levels, it is necessary to use the simultaneous variations of several clay indicators.

Thanks to the calculation of an optimizing function in which all these indicators are taken into account, it is possible to determine which levels are the most argilaceous and which are very probably composed of pure clay, and to deduce a value of the clay parameters utilizable in the rest of the operations.

The measurements made in the borehole contain certain parameters and make it possible to calculate other parameters which vary as a function of the presence of clay and which are generally maximum or minimum in pure clay. Clay indicators are selected from among these variable parameters.

The variable parameters taken into consideration are the following:

(a) the natural measured gamma radioactivity GR which, in general, is maximum in the clay;

(b) the measured spontaneous potential which is maximum or minimum in the clay depending on the polarity;

(c) the calculated product $GR \times \phi_N$ in which $\phi_N$ is the porosity measured by the neutron probe.

To avoid the causes of error which could be due to radioactive formations, all measurements of GR higher than 150 are eliminated.

The product $GR \cdot \phi_N$ is maximum in the clay.

(d) the apparent matrix density $\rho_{maa}$ calculated according to the formula:

$$\rho_{maa} = \frac{\rho_b - \phi_N \cdot \rho_{mf}}{1 - \phi_N} \quad (12)$$

in which $\rho_b$ and $\phi_N$ are the density and the neutron porosity measured and $\rho_{mf}$ is the density of the filtrate present in the pores, which is known. The density $\rho_{maa}$ is maximum in the clay. To avoid errors due to other formulations having a high matrix density, the low porosity levels are eliminated by making a cut on the small values of $\phi_N$. The anhydrite strate have been noted during the Phase II and are already eliminated.

(e) The ratio $\phi_D/\phi_N$ which is minimum in the clay. Since the calculation of $\phi_D$ requires that we know the matrix density $\rho_{ma}$ which generally is not known, the following equivalent parameter is calculated:

$$N' = \frac{3.05 - \rho_b}{\phi_N + 0.20} \quad (13)$$

which is also minimum in the clay.

(f) the calculated ratio:

$$M = \frac{\Delta t_f - \Delta t}{100(\rho_b - \rho_{mf})} \quad (14)$$

in which expression $\Delta t$ is the measurement of the acoustic travel time in the formation, $\Delta t_f$ the acoustic travel time in the fluid which fills the pores and $\rho_{mf}$ the density of the mud filtrates.

This ratio is minimum in the clay.

(g) the calculated ratio:

$$M' = \frac{100(3.05 - \rho_b)}{\Delta t - 20} \quad (15)$$

which is minimum in the clay.

(h) the measured diameter of the borehole d, maximum in the clay.

The Stage III includes several phases.

Phase III$_1$-for selecting the best clay indicators.

Phase III$_2$-for determining the most argilaceous level and the least argilaneous level of each interval.

Phase III$_3$-for determining the clay parameters.

Phase III$_1$

The purpose of Phase III$_1$ is to select, from among the eight variable parameters sensitive to the presence of clay, the best clay indicators of which there are at least two. In the chosen example, the number of clay indicators is taken equal to at least five to improve accuracy.

This selection is obtained by calculating the mutual correlation coefficients of the parameters and by retaining those which have the best correlation between them.

If we consider two variable parameters x and y, whose values corresponding to a level i are $x_i$ and $y_i$, the correlation coefficient Cxy between these two parameters is calculated by the known formula:

$$Cxy = \frac{\sum_{i=1}^{n} x_i \cdot y_i - n \bar{x} \cdot \bar{y}}{\sqrt{\sum_i (x_i - \bar{x})^2 \cdot \sum_i (y_i - \bar{y})^2}} \quad (16)$$

in which $\bar{x}$ and $\bar{y}$ are the average values.

It is known that the correlation is perfect if Cxy is close to 1, poor if $|C| < 0.5$, good if $C > 0.5$ and that there is an anti-correlation if $C < -0.5$.

In the example shown, we calculate for each geological stage the mutual correlation coefficient between each pair of variable parameters sensitive to clay. It would also be possible to calculate the correlation coefficients by intervals within each stage. We construct a square matrix of which each line and each column corresponds to one of the variable parameters and we place in the box corresponding to each intersection the mutual correlation coefficient between the two parameters corresponding to the line and to the column.

We take the sum of the absolute values of each line. The pivot indicator is the one having the maximum sum. We consider the two parameters corresponding to the two highest sums of absolute values. We keep as the best clay indicators the parameters which have a correlation coefficient with the two best parameters higher than 0.6 in absolute value. If the number of indicators thus selected in not equal to at least five, we retain the best five indicators having the best correlation coefficients with the two selected parameters.

We determine at the same time the polarity of S.P. from the sign of the coefficient of correlation between S.P. and the pivot indicator.

The pivot indicator is assigned a positive sign if it is maximum in the clay and a negative sign in the opposite case. The polarity of the spontaneous potential in the clays has the same sign as the product of the sign of the pivot indicator multiplied by the mutal correlation coefficient between S.P. and the said pivot indicator.

To say S.P. has a positve polarity means that its value in the clays is higher than in the clean formations and that it has a maximum value in the clays, and vice versa if the polarity is negative.

Phase III$_2$

Each geological unit is divided into intervals of a given height, for example intervals of 250 feet or 75 meters.

The purpose of phase III$_2$ is to determine, in each interval, the most argilaceous level and the least argilaceous level.

It is considered that these levels are those which optimize a choice function in the calculation of which are included the values of the selected clay indicators.

It is first necessary to make these indicators comparable by normalizing their variations. The normalized variation is obtained by dividing the variations by a normalization coefficient.

We first calculate, in each interval, the statistical maximum and minimum of each of the clay indicators k and the range of variation Dk equal to the difference between this maximum and this minimum.

The statistical maximum and minimum of a clay indicator k are the values xk1 and xk2 which give the maximum value to a function:

$$P_{(i)} = \sum_j \frac{\text{sign } (i,j)}{1 + \alpha |x_i - x_j|^n} \quad (17)$$

in which $\alpha$ is a positive coefficient and n a positive exponent. In general, we choose n=2.

The sign is the same as that of the difference $x_i-x_j$ for the calculation of the statistical maximum and the opposite of that of the difference $x_i-x_j$ for the calculation of the statistical minimum.

The variation range Dk of a clay indicator k in an interval is equal to xk2-xk1. The variations of the different indicators are normalized by dividing each of them by a normalization coefficient Nk whose absolute value is chosen such that the normalized variation range of each indicator is the same and equal to n units of variation.

$$\text{Thus, } |Nk| = \frac{|Dk|}{n}.$$

However, for each clay indicator, we set a minimum variation range $\lambda k$, corresponding to n units. If the variation range of the said indicator is smaller than $\lambda k$, we choose as the absolute value of the normalization coefficient $$|Nk| = \frac{|\lambda k|}{n}.$$

The normalization coefficient is assigned a positive sign if the corresponding clay indicator has a maximum value in the clay and a negative sign if the clay indicator has a minimum value in the clay.

For the indicator consisting of the diameter of the hole measured in inches, the value of the normalization coefficient is set equal to 0.5. If we use a normalized variation range equal to 30 units, the minimum values of $\lambda k$ for the other indicators are as follows: SP=60 mv; GR=75 API; $\phi_N$.GR=30; $\rho_{maa}$=0.45; N'=0.60; M=0.18; M'=0.42.

After this operation for normalizing the variations of the different clay indicators, we come to the operations for determining the most argilaceous level and the least argilaceous level of each interval.

For each level i of the interval, we calculate the function $$P'(i) = \sum_j [F'(i,j) \cdot \text{sign } (i,j)]$$

where F'(i,j) is chosen as:

$$F'(i,j) = \frac{1}{1 + \alpha \sum_{k=1}^{n} \left| \frac{xk(i) - xk(j)}{Nk} \right|^n} \quad (18)$$

and $\alpha$ is a positive coefficient and n a positive exponent, for example 1 or 2. F'P'$_{(i)}$ is the sum of the values of F'(i,j) when i is fixed and j takes on successively all the values of the interval, and sign (i,j) is assigned a value $-1$, 0 or 1 depending on the sign of the normalized variation defined below.

We choose as the most ariglaceous level and as the least argilaceous level of each interval those which give the function P'(i) its maximum value.

The most argilaceous level is the one which gives the maximum value of the function P'(i) in which the following values are given to the sign expression (i,j):

$+1$ if $\frac{xk(i) - xk(j)}{Nk} > 0$ for every indicator k.

$0$ if $\frac{xk(i) - xk(j)}{Nk} < 0$ for a single indicator k.

$-1$ if $\frac{xk(i) - xk(j)}{Nk} < 0$ for several indicators k.

The least argilaceous level is the one which gives the maximum value of the function P'(i) in which the following values are given to the sign expression (i,j):

+1 if $\frac{xk(i) - xk(j)}{-Nk} > 0$ for every indicator $k$.

0 if $\frac{xk(i) - xk(j)}{-Nk} < 0$ for a single indicator $k$.

−1 if $\frac{xk(i) - xk(j)}{-Nk} < 0$ for several indicators $k$.

The determination of the most argilaceous level and the least argilaceous level is similar to the determination of the statistical maximum and the statistical minimum of all the values of a single indicator.

What is involved is determining the statistical maximum and minimum of the clay proportions furnished by several different indicators after having normalized the information furnished by these different indicators to make them comparable to each other.

Phase III$_3$: Determination of clay parameters

Having determined the most argilaceous level of each interval, we calculate the apparent matrix density $\rho_{maa}$ of each of these levels according to the formula (12) and we consider the largest apparent densities thus found, called $\rho_{ma\ max}$ and we designate the level and the interval to which it belongs as the pivot level and interval. It would also be possible to calculate other parameters for all the most argilaceous levels, for example the parameter M according to the formula (14).

Three cases are to be considered:

If $\rho_{ma\ max} > 3$ or if corresponding $M < 0.65$, we consider that the pivot level is composed of pure clay and the parameters ($\rho_{bCl}$, $\phi_{NCl}$, $R_{t\ Cl}$, $SP_{Cl}$, $GR_{Cl}$ and $\Delta t_{Cl}$) corresponding to the pivot level as retained as values of the clay parameters for the entire pivot interval.

If $\rho_{ma\ max} < 2.9$ and $M > 0.68$, we consider that throughout the studied geological stage, there is no sufficiently argilaceous formation to allow the valid calculations of the clay parameters and, in the case, the clay parameters must be taken from a file.

If $2.9 < \rho_{ma\ max} < 3$ or if $0.65 < M < 0.68$, we assume that the apparent density of the pure clay in the pivot interval $\rho_{ma\ Cl} = 3$. From this value, and from the value of $\rho_{ma\ max}$ and the value of the apparent matrix density $\rho_{ma}$ in the pivot interval, which is known, we calculate by linear interpolation the clay percentage $V_{Cl}$ or the pivot level according to the approximate formula:

$$V_{Cl} = \frac{\rho_{ma\ max} - \rho_{ma}}{\rho_{maCl} - \rho_{ma}} \qquad (20)$$

Knowing the clay percentage of the pivot level, we derive the values of the clay parameters of this level, valid for the entire interval, by the diferent formulas which express the clay percentage as a function of the variations of a parameter. For example, we calculate $GR_{Cl}$ by the formula:

$$V_{Cl} = \frac{GR - GR_{ma}}{GR_{Cl} - GR_{ma}} \qquad (21)$$

which $GR_{ma}$ is the gamma radioactivity in the matrix of the pivot interval, which is known.

Other parameters for the entire interval may be determined as follow: $SP_{Cl}$ is set equal to the spontaneous potential measured at the pivot level. $R_{t\ Cl}$ is determined by:

$$V_{Cl} = \sqrt{\frac{R_{t\ Cl}}{R_t}} \qquad (26)$$

where $R_t$ is resistivity reading at the pivot level. The value of $\rho_{b\ Cl}$ is computed from the value of $\rho_b$ and $\phi_n$ at the pivot level and the neutron porosity measurement for the matrix rocks in the interval j, $\phi_{N\ ma}$.

$$\rho_{bCl} = \frac{\rho_b + F\rho_{ma}}{1 + F} \qquad (27)$$

where:

$$F = \frac{A \cdot C(V_{Cl} - 1)}{A \cdot D - B\ V_{Cl}} \qquad (28)$$

and $$A = \rho_b - \phi_N - \rho_{ma} + \phi_N \rho_{ma} \qquad (29)$$

$$B = (1 - \phi_N)(\rho_{ma} - 1)\phi_{N\ ma} \qquad (30)$$

$$C = 1 - \phi_N \qquad (31)$$

$$D = 1 - \phi_{N\ ma} \qquad (32)$$

The neutron porosity of clay, $\phi_{N\ Cl}$, is found according to the formula:

$$\phi_{NCl} = \frac{\phi_N + F\phi_{N\ ma}}{1 + F}. \qquad (33)$$

The acoustic transit time for clay, $\Delta t_{Cl}$ is computed as:

$$\Delta t_{Cl} = \frac{\Delta t + F\Delta t_{ma}}{1 + F} \qquad (34)$$

where $\Delta t$ is acoustic transit time for the pivot level and $\Delta t_{ma}$ is the acoustic transit time for the matrix rocks in the interval.

For each of the intervals other than the pivot $\rho$interval, we consider the value of the apparent density $\rho_{ma\ Cli}$ calculated for the most argilaceous level of the interval.

Two cases are to be considered:

If $\rho_{ma\ Cli} > 3$ and $\rho_{ma\ Cli} > \rho_{ma\ max} - 0.05$ whichever is larger, $\rho_{ma\ max}$ being either the value found for the pivot level if this value is higher than 3, or 3 in the opposite case, we consider that the corresponding level is composed of pure clay and the parameters for the corresponding interval are taken as being equal to the value at this level.

If the preceding condition is not met, we calculate the clay percentage $V_{Cli}$ of the most argilaceous level of the interval by linear interpolation, assuming that the apparent density of the clay of this level is the one which was found for the pivot level $\rho_{ma}Cl_{max}$ and by using the known apparent matrix density of the corresponding interval $\rho_{ma}$:

$$V_{Cli} = \frac{\rho_{ma}Cl_i - \rho_{ma}}{\rho_{ma}\ Cl_{max} - \rho_{ma}}. \qquad (22)$$

If the value of $V_{Cli}$ thus calculated is higher than 0.60, it is considered that the corresponding level is sufficiently argilaceous to allow the calculation of the values of the valid clay parameters.

These parameters, valid for the entire interval, are computed as before for the pivot level, from the known formulas expressing the clay percentage as a function of the different parameters.

By contrast for the spontaneous potential we use as the value of the spontaneous potential in the clay $SP_{Cl}$, valid for the entire interval, the value measured for the most argilaceous level of the interval because, beyond a clay content 0.60, the spontaneous potential remains substantially constant.

If the clay proportion of the most argilaceous level of an interval is smaller than 0.60, we consider that there is no sufficiently argilaceous level in the interval to allow a valid computation of the clay parameters and, in this case, the clay parameters of the interval are computed by the linear interpolation of the values of the clay parameters of the intervals located on either side. If what is involved is an interval located at one end of the geological stage, we choose as the values of the clay parameters of this interval those of the adjacent interval.

Determination of $V_{Cl}$ from GR

The purpose of the Phase III$_3$ is also to provide a first approximate evaluation of the clay proportion $V_{Cl}$ contained in each level.

It is known that an approximate upper limit of the clay proportion $V_{Cli}$ of the natural gamma radioactivity of this level by linear interpolation from gamma radioactivity values in the pure clays, $GR_{Cl}$ and in the formations without clay, $GR_o$, according to the formula (5), The invention makes it possible to determine with good accuracy the values of $GR_o$ and $GR_{Cl}$ along the borehole.

We consider all the values of GR measured for all the least argilaceous levels of each interval. We determine the smallest of these values, that is $GR_{min}$.

Likewise, we consider all the values of GR measured for all the most argilaceous levels of each interval and we calculate the largest of these values, namely $GR_{max}$.

We use these values $GR_{min}$ and $GR_{max}$ to determine over the entire borehole the reference lines of the values of $GR_{Cl}$ and of $GR_o$. We first look for all the intervals for which the measured value of GR remains statistically stable over a thickness of at least 10 feet or 3 meters. We consider this condition to be fulfilled if the standard deviation, $\sigma$, remains smaller than a limit, for example $$\frac{\sqrt{GR}}{2}$$

If this stable value is near the value $GR_{min}$, we consider the said thickness as a formation without clay and the corresponding value of GR as a measurement of $GR_o$.

If this stable value is near $GR_{max}$, we consider the stable value GR as a measurements of $GR_{Cl}$.

For example, we consider that the values of GR which are higher than $GR_{min}$ by an amount smaller than one-fifth of the deviation between $GR_{max}$ and $GR_{min}$ correspond to clean formations, that is $GR_{(i)} = GR_o$ if:

$GR_{(i)} - GR_{min} > 0.2(GR_{max} - GR_{min})$.

Likewise, we consider that the values of GR which deviate from $GR_{max}$, in either direction, by an amount smaller than one-fifth of the difference between $GR_{max}$ and $GR_{min}$ correspond to pure clay, that is:

$GR_{(i)} = GR_{Cl}$ if:

$0.8(GR_{max} - GR_{min}) < GR_{(i)} GR_{min} < 1.2(GR_{max} - GR_{min})$.

If, in an interval, there is no stable value of GR sufficiently close to $GR_{min}$ and $GR_{max}$, then $GR_{min}$ and $GR_{max}$ are used as values of $GR_o$ and $GR_{Cl}$.

We determine the continuous reference lines of the values of $GR_o$ and of $GR_{Cl}$ in the following manner:

The lowest of the values of $GR_{Cl}$ is extended on either side up to the next stable value of $GR_{Cl}$. Then, the same is done for the value of $GR_{Cl}$ immediately above and so on util we have obtained a continuous step line over the entire length of the borehole, which serves as the reference line for the values of $GR_{Cl}$ in the argilaceous formations.

In the same manner, we determine a continuous reference line or baseline of the values of $GR_o$ corresponding to the clean formations.

We first extend each section corresponding to $GR_o$ over the entire extent of a permeable bed whose limits are defined by constant readings of SP equal to the readings in the clay.

In the same manner, the continuous line of $GR_o$ is obtained by combining the voids begining with the smallest value of $GR_o$.

For each level (i) it is thus possible to calculate $V_{Cl(i)}$ using the values of $GR_o$ and $GR_{Cl}$ given by the two reference lines thus determined.

Determination of $V_{Cl}$ from SP

An approximate upper limit of the clay proportion contained in a level (i) can also be derived from the measurement of the spontaneous potential in the said level $SP_{(i)}$ by linear interpolation from, on the one hand, the values of the spontaneous potential in the clay $SP_{Cl}$ which constitute the base line and, on the other, in the clean formations, and this is called the static spontaneous potential or SSP.

The formula used is the following:

$$V_{Cl} SP = \frac{SP - SSP}{SP_{Cl} - SSP} \qquad (19)$$

Whenever the measurement SP remains statistically constant, the standard deviation $\sigma$ being lower than 0.5 mv over at least 8 feet or 2.50 meters or lower than 1.2 mv over at least 16 feet or 5 meters, we consider that the measurement corresponds to the base line or to the static spontaneous potential. For each of these sections, we calculate the apparent matrix density $\rho_{maa}$ by the formula (12) and we compare the value found with the density of the clay $\rho_{ma\,Cl}$ previously calculated. If the difference $\rho_{ma\,Cl} - \rho_{maa}$ is near zero, for example, lower than 0.05 and if, at the same time, the clay proportion $V_{Cl}$GR calculated from the measurements of GR is greater than 50%, we consider the corresponding value of SP to be the measurement of SP in the clay $SP_{Cl}$.

To be on the safe side, it is possible to add other conditions, for example the condition that the value of the indicator M should be lower than 0.70.

If, on the contrary, $\rho_{ma\ Cl} - \rho_{maa} < 0.30$ and if $V_{Cl}GR < 20\%$, the corresponding value of SP is considered to be a measurement of SSP.

The base line of the spontaneous potential in the argilaceous formations is the broken line which connects all the middles of the segments identified as corresponding to $SP_{Cl}$.

The reference line for values of SSP is determined by extending the SSP value for each section over the entire extent of a permeable bed whose limits are defined by two clay beds on opposite sides of the permeable bed. The clay beds are described as having constant SP readings equal to the readings in clay. This is the same procedure as used in extending the base line for $GR_o$. The voids between the SSP base line are filled in as described above.

The deflections of the static spontaneous potential, i.e., the deviations between the value of the static spontaneous potential and the base value of the spontaneous potential, are read from the base line thus plotted. For the evaluation of the clay percentage, consideration is given only to the intervals in which the deflections of SSP are negative and smaller than $-30$ mv.

In conculsion, Stage III makes it possible to calculate for each interval an approximate value of the clay parameters, in particular of the clay density $\rho_{ma\ Cl}$, clay porosity $\phi_{N\ Cl}$, clay resistivity $R_{t\ Cl}$, spontaneous potential in the clay $SP_{Cl}$, and acoustic transit time in the clay $\Delta t_{Cl}$. These values are used as input values in a more detailed program which has already been described in earlier patent applications.

Stage III also makes it possible to determine relatively accurate values of the parameters $GR_o$ and SSP corresponding to the levels without clay and, from these values, to calculate the clay proportion $V_{Cl}$ in each level.

On the basis of this calculation, it is possible to determine the low clay levels which are used in Stage IV to calibrate the instruments for the measurement of porosity $\phi_N$ and density $\rho_b$.

Figure 6:
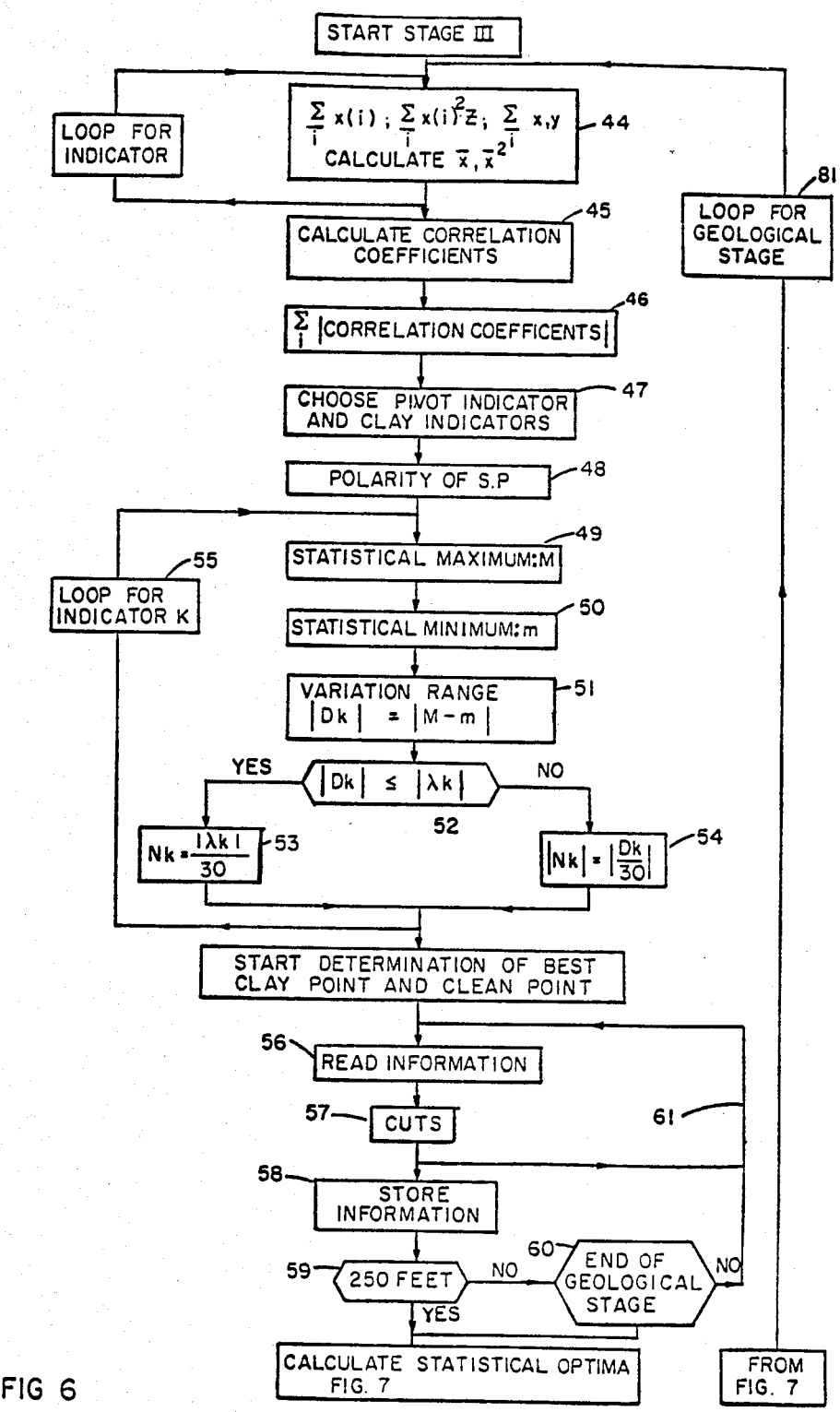
Figure 7:
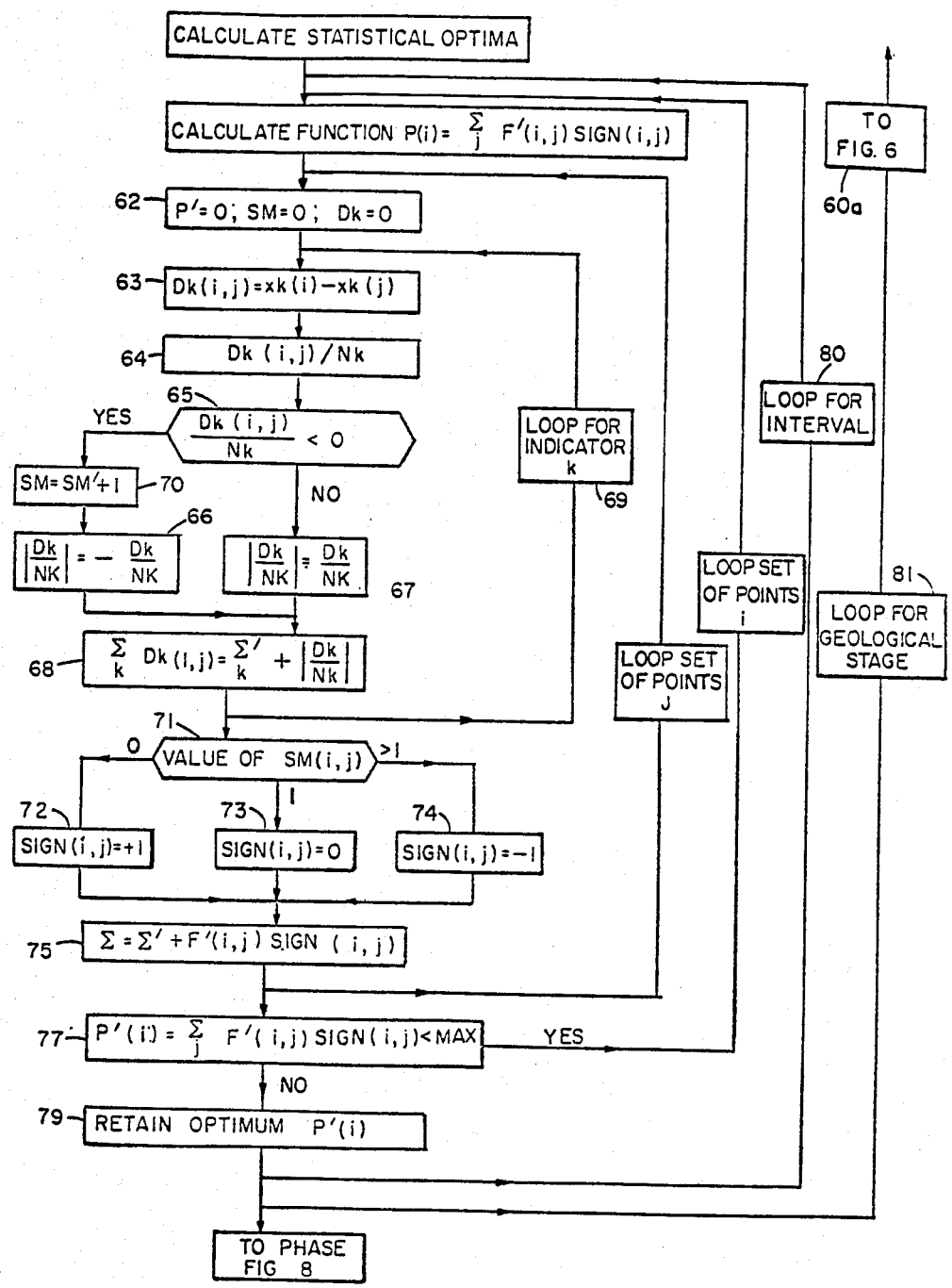
Figure 8A:
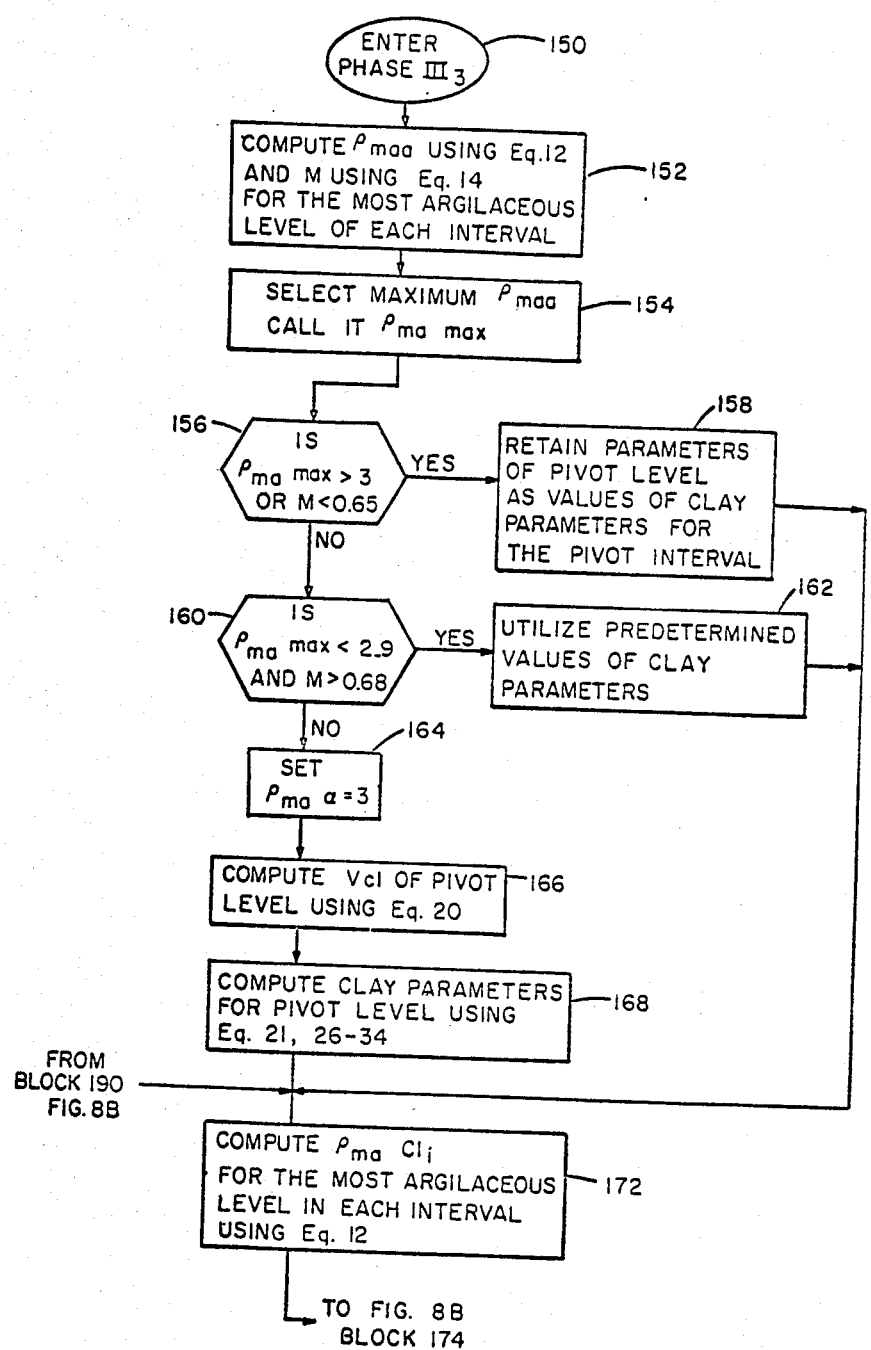
Figure 8B:
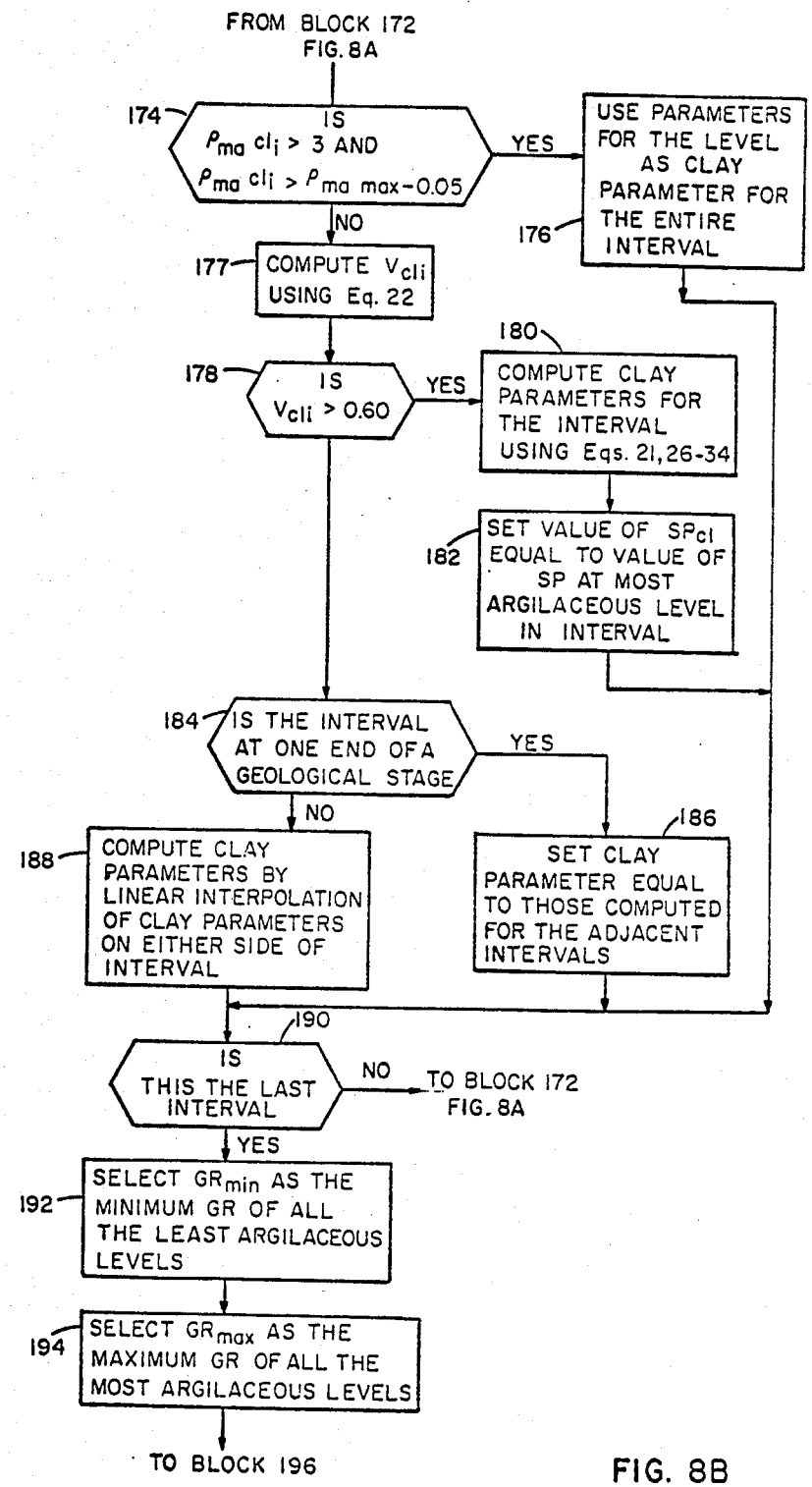
Figure 8C:
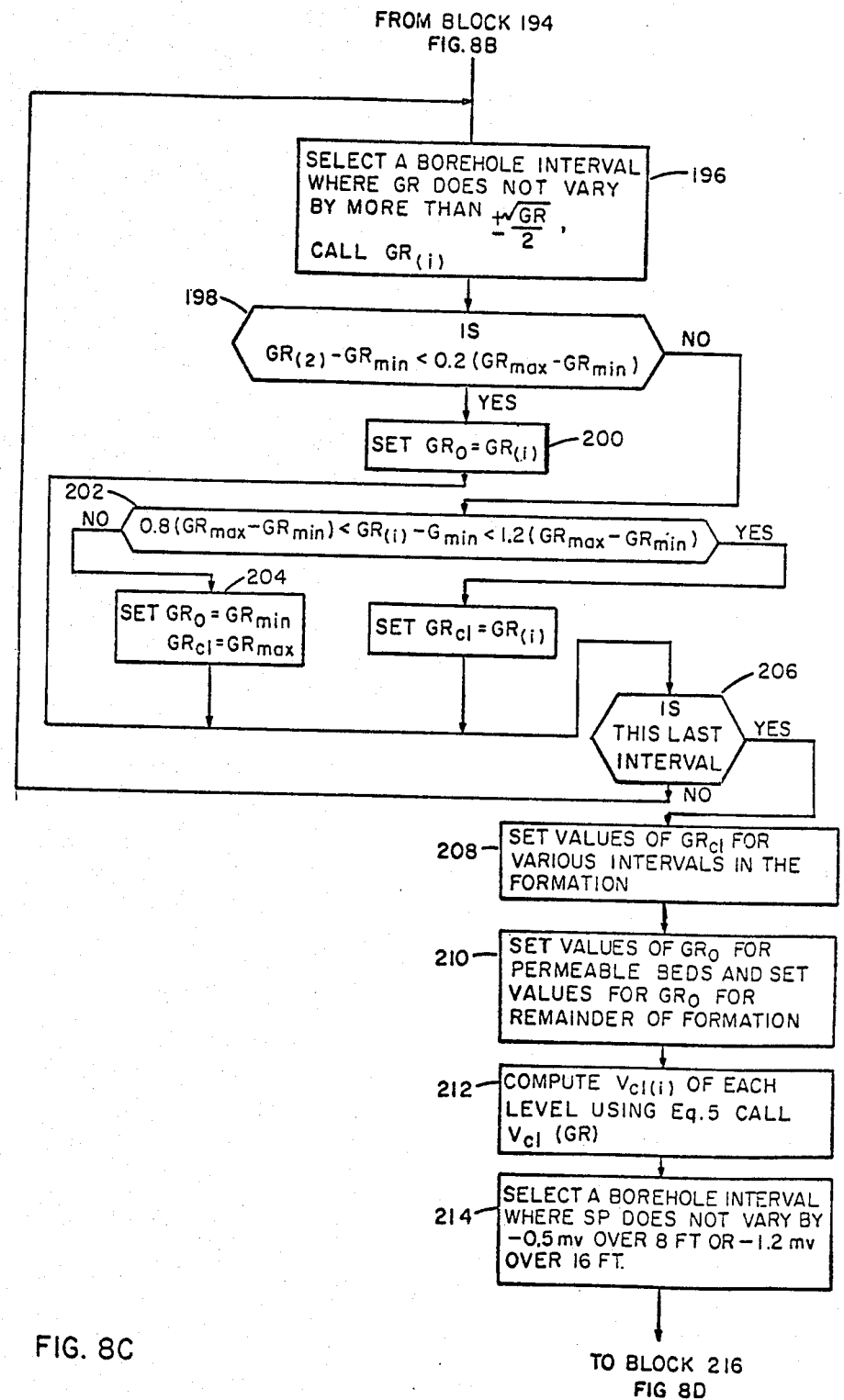
Figure 8D:
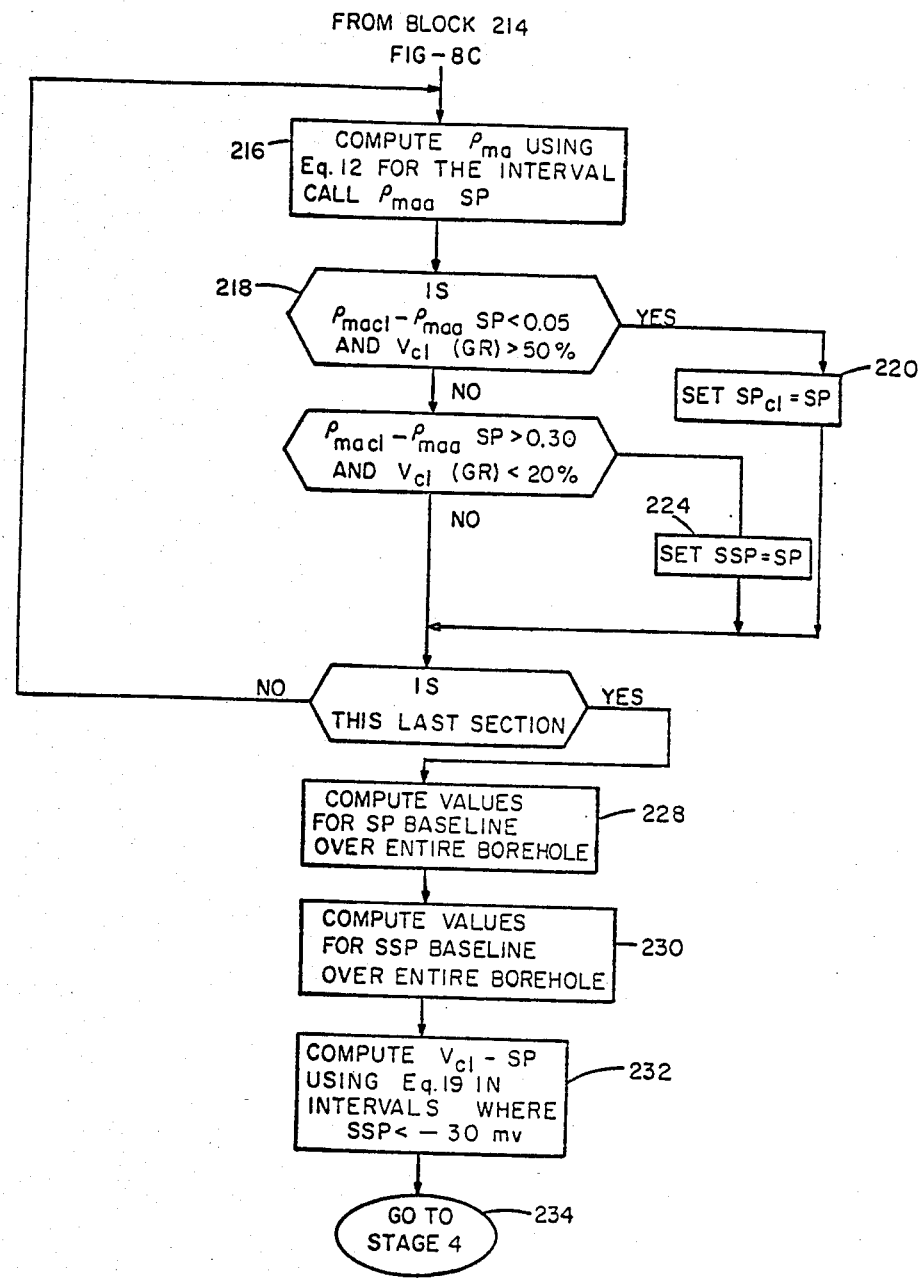

FIGS. 6 and 7 represent the flow chart of the operations which constitute Stage III.

Phase III$_1$

Block 44 represents the calculations making it possible to calculate the correlation coefficient of each variable parameter $x_i$ with each of the other parameters $y_j$ over the extent of a geological stage.

For each of the parameters k, we calculate, for all the levels i of a geological stage:

(1) the sum $\Sigma_i x_{(i)}$ of the values of the said parameter.

(2) the sum $\Sigma_i x_{(i)}^2$ of the squares of the values of the said parameter.

(3) the sum $\Sigma_i x_{(i)} \cdot y_{(i)}$ of the products of the values taken on by the said parameter multiplied by the values $y_{(i)}$ taken on by each of the other parameters.

(4) the average $\bar{x}$ of all the values of each parameter and the square $\bar{x}^2$ of this average.

A loop 44a is made for each indicator k. These sums and averages make it possible to calculate correlation coefficient between two parameters according to the formula (16).

The term $\Sigma_i (x_i - \bar{x})^2$ which appears in the formula (16) and which is the sum of the standard deviations is equal to:

$$\sum_i x_i^2 - 2n\bar{x} \cdot \Sigma_i x_i + n\bar{x}^2.$$

Block 45 represents the calculation of the correlation coefficient of each parameter k in relation to each of the other parameters.

Block 46 represents the calculation of the sum of the absolute values of the correlation coefficients of each parameter in relation to each of the others.

Block 47 represents the selection of the pivot indicator, i.e., that of the parameters whose sum calculated by the block 46 has a maximum value, and also the selection of the second best indicator and of the clay indicators which will be adopted for the rest of the processing.

Block 48 represents the determination of the sign of the polarity SP.

Phase III$_1$ is completed.

Phase III$_2$

Block 49 represents the calculation of the statistical maximum of all the values of each clay indicator $x_k$ and the block 50 the calculation of the statistical minimum of all the values of each indicator.

This maximum and this minimum are the values which correspond to the level $i_1$ and $i_2$ for which the function $$P_{(i)} = \sum_j \frac{\text{sign}\,(i,j)}{1 + \alpha\,|x_i - x_j|^n}$$

has a maximum value.

We choose $n=2$ for example. The value of $\alpha$ varies dependent upon the formation. In practice, three different values of $\alpha$ are chosen, for example $2.10^{-4}$, $2.10^{-3}$ and $2.10^{-2}$, allowing the calculation of three statistical minimums or maximums and we then take the average of the three values thus calculated.

The value of the sign is equal to or opposite that of the difference $x_i - x_j$ depending on whether the maximum or the minimum is sought.

Block 51 represents the calculation of the absolute value of the variation range $|Dk|$ of each indicator which is the difference between the values determined by the blocks 49 and 50.

Block 52 represents the comparison of $|Dk|$ with the minimum variation range $|\lambda k|$ corresponding to 30 variation units.

If $|Dk| \leq |\lambda k|$, the aboslute value of the normalization coefficient $|Nk|$ is calculated by the block 53 according to the formula $$|Nk| = \frac{|\lambda k|}{30}.$$

If, on the other hand, $|Nk|$ is greater than $|\lambda k|$, the block 54 calculates an absolute value of the normalization coefficient $$|Nk| = \frac{|Dk|}{30}.$$

The flow chart includes a loop 55 for each clay indicator.

Phase III$_2$ is then pursued for the determination of the most argilaceous levels and the least argilaceous levels.

Each geological stage is divided into intervals of a given thickness, for example into intervals of 250 feet and we determine the most argilaceous level and the least argilaceous level for each interval.

For each interval, we read the information level by level (block 56).

Cuts are made to eliminate all the levels corresponding to anhydrite, salt, coal or compact formations which were determined during state II. We also eliminate the levels corresponding to values of GR higher than a limit, for example 150 API units and the levels for which porosity measured by the neutron probe is low.

For example, we take only the levels for which $\phi_N > 10$ porosity units.

Likewise, we take only the levels for which the ratio $R_{xo}/R_t$ is between certain limits, for example between 0.5 and 2.

Block 57 represents these eliminations.

Block 58 represents the storage of the adopted information. Owing to the abundance of this information, only one information item out of two is stored in order to reduce the calculations.

Block 59 determines, after each level, whether the thickness of the interval considered is reached. If not, block 60 determines whether the limits of the considered geological stage have been reached. If this is not the case, we form a loop 61 to go on to the next level.

If blocks 59 or 60 determine that the limits of the interval or of the geological stage are reached, the reading of information relative to an interval is terminated and the program is pursued by calculating the statistical optima of the considered interval. The flow chart of this calculation is shown in FIG. 7.

For each level i of the interval, we determine the value of the function $P'_{(i)}$ and we determine for which level i the function $P'_{(i)}$ has a maximum value. The calculation is substantially the same for determining the most argilaceous level and the least argilaceous level.

In both cases, we look for the maximum of a function:

$$P'_{(i)} = \sum_j F'_{(i,j)} \text{ sign } (i,j)$$

where $F'_{(i,j)}$ is given by Equation 18.

We then go from the calculation of the most argilaceous level to the calculation of the least argilaceous level by modifying only the value of the sign Nk.

FIG. 7 represents the calculation of the most argilaceous level.

Block 62 represents the values at the beginning of the interval. The function $P'=0$.

S.M. represents an index which corresponds to the number of times the expression Dk/Nk is negative. Dk/Nk is the normalized variation of an indicator.

We consider two levels i and j of the interval and a clay indicator k.

We first calculate the difference $xk_{(i)} - xk_{(j)}$, that is the difference between the values of the indicator k for the levels i and j (block 63).

We then calculate the normalized variation $$\frac{Dk_{(i,j)}}{Nk} = \frac{xk_{(i)} - xk_{(j)}}{Nk} \text{ (block 64).}$$

Block 65 determines whether the normalized variation is positive or negative.

If it is negative, block 66 calculates the absolute value $$\left| \frac{Dk}{Nk} \right| = - \frac{Dk}{Nk}.$$

(The operation of block 70 will be explained below).

If it is positive $$\left| \frac{Dk}{Nk} \right| = \frac{Dk}{Nk} \text{ (block 67).}$$

Block 68 calculates the new partial sum:

$$\sum_k \left| \frac{Dk}{Nk} \right| = \sum_k' + \left| \frac{Dk}{Nk} \right|$$

that is, block 68 adds to the preceding value $$\sum_k' \text{ the value } \left| \frac{Dk}{Nk} \right|$$

furnished by block 66 or block 67.

A loop 69 is made to take into account the values corresponding to the levels i and j furnished by all the indicators k. When the loop is completed, block 68 furnishes $$\sum_k \left| \frac{Dk}{Nk} \right|$$

corresponding to the two levels i and j.

It is thus possible to compute the function:

$$F_{(i,j)} = \frac{1}{1 + \alpha \sum_k \left| \frac{Dk}{Nk} \right|^n} \tag{18'}$$

by choosing for $\alpha$ a positive value, for example 1 and for n, a positive value, for example 1. It is seen that Equation 18' is Equation 18 in rewritten form.

We next have to compute:

$$P_{(i)} = \sum_j [F_{(i,j)} \cdot \text{sign } (i,j)].$$

If block 65 has determined that $$\frac{Dk}{Nk} < 0,$$

block 70 calculates a new value of $SM = SM' + 1$, $SM'$ being the preceding value.

Once the loop 69 has been completed for all the indicators k, we obtain a total value of $SM_{(i,j)}$ for the two level i and j.

Block 71 determines whether this value is equal to 0, to 1 or is higher than 1.

If $SM_{(i,j)} = 0$, that is for every k, $$\frac{Dk}{Nk} > 0,$$

sign (i,j) = +1 (block 72).

If $SM_{(i,j)}=1$, that is, if there is one indicator k and only one for this Dk/Nk<0, sign (i,j)=0 (block 73).

If $SM_{(i,j)}>0$, sign (i,j) = −1 (block 74).

In the case where the least argilaceous level is sought, we replace Nk by −Nk and we record, in the same manner, Dk/−Nk<0, and the sign of (i,j) is determined in the same manner.

Knowing the value of sign (i,j) and of the function:

$$F_{(i,j)} = \frac{1}{1 + a \sum_k \left| \frac{Dk}{Nk} \right|^n}$$

we compute the product $F'_{(i,j)} \sin(i,j)$

We compute each time a new partial sum: $\Sigma = \Sigma' + F'_{(i,j)} \cdot \text{sign}(i,j)$ (block 75), $\Sigma'$ being the preceding value.

We then make a loop 76 for each of the levels j of the interval.

When all the intervals j have been taken into account, the sum represents $$P'_{(i)} = \sum_j [F_{(i,j)} \cdot \text{sign}(i,j)].$$

Block 77 compares this sum $P'_{(i)}$ with the maximum values of the same sum found previously.

If this value is smaller, it need not be recorded, and the program forms a loop 78 to scan all the levels i of the interval.

If the value

If the value $P'_{(i)} = \sum_j [F_{(i,j)} \cdot \text{sign}(i,j)]$ is is higher than the previously found maximum, it is recorded.

At the end of an interval, the level which corresponds to the maximum of $P'_{(i)}$ is the most argilaceous level or the least argilaceous level of the interval and it is retained (block 79).

The program then executes a loop 80 for the next interval, and then a loop 81 for the next geological stage, returning to block 44, FIG. 6.

The program is then pursued for the study of the stability of the gamma radioactivity, of the spontaneous potential and of the clay parameters. The flow chart of these operations which constitute phase III$_3$ is shown in FIG. 8.

Referring now to FIG. 8, phase III$_3$ is entered via block 150. The apparent matrix density $\rho_{maa}$ and the parameter M is computed using equations 12 and 14 respectively, for the most argilaceous level in each interval, block 152. Next, the largest of the apparent densities is selected and called $\rho_{ma\ max}$, block 154. The level at which $\rho_{ma\ max}$ is found is designated the pivot level and the interval containing that level is designated the pivot interval.

The parameters for the pivot interval are now computed. To this end, decision element 156 asks if $\rho_{ma\ max}$ is greater than 3 or whether M is less than 0.65. If it is the level is considered to be composed of pure clay and the values of the parameters for the pivot level ($\rho_b$, $\phi_N$, $R_t$, SP, GR, $\Delta t$) are retained as the clay parameters for the entire pivot interval, block 158. If the answer is NO, decision element 160 asks if $\rho_{ma\ max}$ is less than 2.9 and whether M is greater than 0.68. If the answer is YES, predetermined values of the parameters are utilized as clay parameters for the interval, block 162.

If the answer from decision element 160 is NO, the clay parameters for the interval must be computed. To this end, $\rho_{ma\ Cl}$ is set equal to 3, block 164. From block 164, the program proceeds to block 166 where the clay percentage is computed for the pivot level using equation 20. Next, the clay parameters valid for the entire pivot interval are determined. First $SP_{Cl}$ is set equal to the value of SP of the pivot level. Then $GR_{Cl}$, $R_{t\ Cl}$, $\phi_{N\ Cl}$ and $\Delta t_{Cl}$ are computed using equations 21 and 26-34. This operation is represented by block 168.

Either from blocks 158, 162 or 168, the program proceeds to block 172 where the operation of computing the clay parameters for the other intervals is begun. For the most argilaceous level in each interval, the apparent matrix density, $\rho_{ma\ cli}$ is computed using equation 12, block 172. Decision element 174 next asks if $\rho_{ma\ cli}$ is greater than 3 and if $\rho_{ma\ cli}$ is greater than $\rho_{ma\ max}$ −0.05 and if it is, the parameters for the interval are set equal to the parameters for the most argilaceous level in the interval, block 176.

If the answer from decision element 174 is NO, the value of $V_{cl}$ for the most argilaceous level, $V_{cli}$ is computed using equation 22, block 177 after which decision element 178 asks if $V_{cli}$ is greater than 0.60 and if it is, the values for the clay parameters are computed using Equations 21 and 26-34, block 180 and the value of $SP_{Cl}$ is set equal to the value of the SP at the most argilaceous level in the interval, block 182. If the answer from decision element 178 is NO, decision element 184 asks if the interval under consideration is at one end of a geological stage. If it is, the clay parameters for the interval are set equal to those of the adjacent interval, block 176 and if it is not, the clay parameters are computed by linear interpolation between the intervals on either side of the interval under study, block 188.

After each interval is processed, decision element 190, asks if this is the last interval and if it is not, the program returns to block 172 to compute the parameters for the next interval. After all the intervals have been processed, YES answer from decision element 190, the program next determines a value of $V_{cl}$ for each depth level using the gamma ray measurements. To this end, the minimum GR, $GR_{min}$ measured for all the least argilaceous levels and the maximum GR, $GR_{max}$, for all the most argilaceous levels is determined, blocks 192 and 194 respectively. Next, sections of the interval are selected for which the GR does not vary by more than $$\pm \frac{\sqrt{GR}}{2},$$

block 196. These values are called $GR_1$.

Next decision element 198 asks if the difference between $GR_i$ and $GR_{min}$ is less than 0.2 ($GR_{max}-GR_{min}$) and if it is, the value of GR in sands, $GR_o$ is set equal to $GR_i$, block 200. If the answer from decision element 198 is NO, decision element 202 determines if GR is near $GR_{max}$ and if it is, $GR_{Cl}$, GR in clay is set equal to $GR_i$. If the answer from decision element 202 is NO, $GR_o$ $GR_{Cl}$ are equal respectively to $GR_{min}$ and $GR_{max}$, block 204. If this is not the last interval, NO answer from decision element 206, the program returns to block 196 for processing of the next interval.

After all the intervals have been processed, baselines for $GR_o$ and $GR_{Cl}$ are established. The baseline for $GR_{Cl}$ is established by first assigning the value of $GR_{Cl}$ computed for the lowest depth level for all depth levels from the lowest depth level in the formation up to the depth level at which the next stable value of $GR_{Cl}$ is computed. Then the next stable value of $GR_{Cl}$ is assigned to all depth levels up to the depth level at which the next stable value of $GR_{Cl}$ is computed and so on until a value of $GR_{Cl}$ is assigned to all depth levels of interest. This is represented by block 208.

The baseline for $GR_o$ is established by assigning values of $GR_o$ to all depth levels in a section of the borehole corresponding to a permeable bed in which the value of GR is computed. The permeable bed can be defined as being bounded on either side by clay beds in which there are constant readings of SP. The value of $GR_o$ for the depth levels in the remainder of the formation are then set using the same procedure as that described above for setting the baseline of $GR_{Cl}$. This operation is represented by block 210.

Knowing the value of $GR_o$ and $GR_{Cl}$ for each depth level, the value $V_{Cl}$ can be computed for each depth lwvel using equation 5, block 212.

The proportion of clay at each depth level can also be determined from the spontaneous potential measurements from knowledge of $SP_{Cl}$ and SSP at each depth level. To determine the SSP and the $SP_{Cl}$ of each depth level, a borehole interval having a statistically constant SP is selected, as represented by block 214. Next, for the interval, the values of the apparent matrix density $\rho_{maa}$, designated $\rho_{maa\,SP}$ is computed using equation 12, block 216. Then decision element 218 asks if the difference between $\rho_{maa}$ SP and $\rho_{ma}$ Cl previously computed for the interval is small, i.e. less than 0.05 and if the proportion of clay computed using the GR measurement, $V_{Cl(GR)}$ is greater than 50%. If it is, $SP_{Cl}$ is set equal to the measured value SP, block 220. If the answer is NO, decision element 222 asks if the difference between $\rho_{ma}$ Cl and $\rho_{maa\,SP}$ is greater than 0.30 and if $V_{Cl(GR)}$ is less than 20%. If the answer is YES, SSP is set equal to SP, block 224. The analysis of one section of constant SP is complete and decision element 226 asks if this is the last section. If it is not, the program returns to block 214. After all sections have been considered, YES answer from decision element 226, the baselines of $SP_{Cl}$ and SSP are set.

For the $SP_{Cl}$ baseline, the values of $SP_{Cl}$ at depth levels located between the depth levels at which $SP_{Cl}$ has been set according to block 220 are computed by considering the values of $SP_{Cl}$ set by block 220 for the depth levels immediately above and below the depth level of interest and using linear interpolation to find the value of $SP_{Cl}$ at the depth level of interest, block 228. The values for SSP are set as described for setting the values of $GR_o$, as represented by block 230. Then the proportion of clay from the SP measurements, $V_{Cl(SP)}$ is computed using equation 19 for those depth levels where SSP is less than $-30$ millivolts, block 232. After which the program goes to stage 4, block 234.

Stage IV—Calibration in water-bearing formations

The purpose of this stage is to calibrate the instruments used for measuring porosity $\phi_N$ and density $\rho_b$, using the measurements obtained in the water-bearing and low-clay formations, this calibration completing the one made in the compact formations and possibly in the levels of anhydrite and salt.

To perform this calibration, we compare the porosity reading $\phi_N$ with the porosity $\phi R_t$ calculated from the true resistivity measurements by the formula (7):

$$\phi R_t = \sqrt[n]{\frac{a \cdot R_w}{R_t}}$$

To perform the calculation of $\phi R_t$, it is necessary to know $R_w$: the resistivity of water contained in the pores of the formations.

Two cases can arise.

In the first case, we know a value $R_{wa}$ sufficiently close to $R_w$ and we shall then make $R_w$ vary around $R_{wa}$. If $R_w$ is not known, even approximately, we calculate a first approximate value, $R_{w1}$, from the static spontaneous potential SSP by the formula:

$$SSP = -k \log \frac{R_{mf}}{R_{w1}} \qquad (23)$$

in which $R_{mf}$ is the resistivity of the mud filtrate.

We calculate a second approximate value, $R_{w2}$, from the maximum value of the ratio $R_{xo}/R_t$ by the formula:

$$\text{maximum} \frac{R_{xo}}{R_t} = \frac{R_{mf}}{R_{w2}} \qquad (24)$$

where the maximum $(R_{xo})/(R_t)$ is determined by computing the statistical maximum of the value $(R_{xo})/(R_t)$ for each depth level.

We choose as an approximate value $R_w'$, the smallest of the two values $R_{w1}$ and $R_{w2}$ and we make $R_w$ vary around $R_w'$ taking into account variation in $R_w$ due to the increase in temperature with depth.

We calibrate by using only the data relative to the low-clay, water-bearing levels, which lead to the most reliable measurements.

We eliminate all the levels corresponding to compact formations, to large hole diameters and to fast variations in measurements with depth.

We keep only the sections for which the deviation of the measurement of spontaneous potential in relation to the base line of SSP is small, smaller than 10 or 15 mv and for which, at the same time, the clay content calculated from the measurement of SP ($V_{Cl}$SP) as well as the clay content calculated from the measurement of GR($V_{Cl}$GR) are smaller than 20%.

For all these levels, we calculate an approximate value of the resistivity of the formation water, $R_{wa}$ ND, by the formula taken from formula 7:

$$R_{wa} ND = 1 \cdot (\phi_{ND})^n R_t \qquad (25)$$

in which $\phi_{ND}$ is the porosity measured on the graph of $\phi_D$ as a function of $\phi_N$ by interpolation between the two curves corresponding to the end matrices (see FIG. 1) and can be computed as:

$$\phi_{ND} = \phi_N + 0.03 \left[ \frac{2.71 - \rho_{maa}}{0.06} \right] \qquad (25')$$

for $\rho_{maa} < 2.71$, or $$\phi_{ND} = \phi_N - 0.03 \left[ \frac{\rho_{maa} - 2.71}{0.16} \right] \quad (25'')$$

for $\rho_{maa} \geq 2.71$

We calculate the statistical minimum $R_{wa}ND_{min}$ of all the values of $R_{wa}ND$ thus calculated.

We retain for the subsequent calibration only the levels for which the resitivity $R_{wa}ND$ is in the neighborhood of this minimum, for example, all the points for which $R_{wa}ND < 2 R_{wa}ND_{min}$, which are clean levels, without hydrocarbons, if $R_{wa}ND_{min}$ is lower than or not much higher than $R_{wa}$.

This set of levels can be classified in terms of increasing clay percentage and if the number is high, for example, higher than 100, we use only the first 100.

We use these points to calibrate the neutron probe which measures the porosity $\phi_N$ and the measuring tool for density $\rho_b$ by successively optimizing several functions.

During a first stage, we consider a function F which depends on the difference between the following two values of porosity:

(1) The value $\phi_{Nc}$ indicated by the neutron probe after correction d $\phi_N$, that is $\phi_{Nc} = \phi_N + d \phi_N$.

The value of $\phi_{Nc}$ thus depends on d $\phi_N$.

(2) The value $\phi R_t$ calculated by the formula (7):

$$\phi R_t = \sqrt[n]{\frac{a \cdot R_w}{R_t}} \quad (7)$$

from the measurement of $R_t$ and the value of $R_w$. This value $\phi R_t$ thus depends on $R_w$.

We compare the difference $\phi_N R_t = \phi_{Nc} - o R_t$ with the known values of the porosity of the two end matrices $\phi_{N\,ma1}$ and $\phi_{N\,ma2}$ with $\phi_{N\,ma1} < \phi_{N\,ma2}$.

We make $R_w$ vary step by step around the approximate value $R_{wa}$ or $R_w'$ previously calculated. For example, we take a series of values equal to k $R_w'$, the coefficient k varying between 0.5 and 2, in steps of 15% approximately.

Likewise, we give d $\phi_N$ a series of values located on either side of zero. For example, we make d $\phi_N$ vary in steps equal to 1 porosity unit between $-8$ porosity units and $+8$ porosity units.

To each pair of values k $R_w'$ and d $\phi_N$, there corresponds, for a given level i a value of the difference $\phi_N R_{t(i)}$.

We calculate a function $F_{(i)}$ of $\phi_N R_{t(i)}$ having the following values:

$F_{(i)} = -1$ if $\phi_N R_{t(i)} < \phi_{N\,ma1}$.

$F_{(i)} = +1$ if $\phi_{N\,ma1} < \phi_N R_{t(i)} < \phi_{N\,ma2}$.

$F_{(i)} = 0$ if $\phi_{N\,ma2} < \phi_N R_{t(i)}$.

For each pair of values d $\phi_N$ and k $R_w'$, we take the sum $$\sum_i F_{(i)}$$

for all the water-bearing and low-clay levels chosen.
We calculate the sum $$\sum_i F_{(i)}$$

for all the possible pairs of values of d $\phi_N$ and k $R_w'$.

Once the calculations are completed, we note the pair of values which corresponds to the maximum of $$\sum_i F_{(i)}.$$

We designate this pair of values by the symbols A for d $\phi_N$ and $R_{waN}$ for k $R_w'$.

Two cases can occur.

In a first case, we do not obtain a clear maximum, i.e., the maximum value of $$\sum_i F_{(i)}$$

is obtained for end values d $\phi_N$ or k $R_w'$, or the obtained maximum is low in relation to the maximum value at the limits, for example lower than 1.5 times times this value at the limits. In these two cases, it is considered that there is no precise maximum.

In a second case, on the other hand, we obtain a very clear maximum of $$\sum_i F_{(i)}$$

for a pair of values d$\phi_N = A$ and $R_{waN}$ from the limits.

In this second case, we select the levels (j) for which $F_{(j)} = +1$ when d$\phi_N = A$ and k $R_w' = R_{waN}$.

We calculate, for each level (j) a value $\rho_{ma}R_{t(j)}$ of the matrix density by the formula (9):

$$\rho_{ma} R_{t(j)} = \frac{\rho_{bc} - \phi R_t \rho_{mf}}{1 - \phi R_t} \quad (9)$$

$\rho_{bc} = \rho_b + d\rho_b$, that is $\rho_{bc}$ is the value of $\rho_b$ corrected by a quantity $d\rho_b$.

$\rho_f$ is the known density of the mud filtrate contained in the pores of the formations.

$\phi R_t$ is the value of the porosity calculated by the formula (7).

$\rho_{ma} R_t$ is thus a function of $R_w$ and of $d\rho_b$. Like before, we make $R_w$ and $d\rho_b$ vary step by step. For example, we choose for $d\rho_b$ a series of values between $-0.06$ and $+0.06$ between which it varies in steps equal to 0.01.

We calculate a function $F'_{(j)}$ of $\rho_{ma}R_{t(j)}$ having the following values:

$F'_{(j)} = +1$ if $\rho_{ma1} < \rho_{ma}R_{t(j)} < \rho_{ma2}$.

$F'_{(j)} = -1$ if $\rho_{ma}R_{t(j)} < \rho_{ma1}$ or $\rho_{ma}R_{t(j)} > \rho_{ma2}$.

$\rho_{ma1}$ and $\rho_{ma2}$ are the densities of the end matrices traversed by the borehole.

For each pair of values $R_w$ and of d $\rho_b$, we compute the sum $$\sum_j F_{(j)}$$

for all the levels j selected.
We note the maximum of $$\sum_j F'_{(j)}$$

and the corresponding values of $R_w=R_{waD}$ and of $d\rho_b=B$.

If $R_{waD}$ is close to $R_{waN}$, for example, $R_{waD}-R_{waN}<\pm(0.15 R_{waN})$, a calibration by a simple scale shift of $\phi_N$ is valid.

In this case, we compute a new value of the matrix density by the formula (12):

$$\rho_{maN(j)} = \frac{\rho_{bc} - \phi_{Nc} \cdot \rho_{mf}}{1 - \phi_N} \quad (12)$$

The value of $\rho_{maN(j)}$ depends on the values of $d\rho_b$ and $d\phi_N$ which are made to vary step by step around zero as previously.

We consider the levels j selected previously and we calculate a function $F''_{(j)}$ of $\rho_{maN(j)}$ having the following values:

$F''_{(j)} = +1$ if $\rho_{ma1} < \rho_{maN(j)} < \rho_{ma2}$ $F''_{(j)} = -1$ if $\rho_{maN(j)} < \rho_{ma1}$ or $\rho_{maN(j)} > \rho_{ma2}$.

For each pair of values of $d\phi_N$ and of $d\rho_b$, we calculate the sum $$\sum_j F''_{(j)}.$$

What is generally obtained is a series of maxim of $\Sigma$ corresponding to values of $d\phi_N$ and of $d\rho_b$ related to each other by a linear relationship.

We choose as the values for zero shift correction for the porosity and density measurements the maximum which corresponds to the pair of values $d\phi_{Nm}$ and $d\rho_{bm}$ closest to $d\phi_N=A$ and $d\rho_m=B$.

The corrected measurements used for the following operations are thus:

$\phi_{Nc}=\phi_N+d\phi_{Nm}$.
$\rho_{bc}=\rho_b+d\rho_{bm}$.

Of course, if the value $R_w$ of the formation water resistivity is known accurately, the values of $d\rho_b$ and of $d\phi_N$ corresponding to $R_w$ are choosen.

If the difference between the values of $R_{waD}$ and of $R_{waN}$ is not small, a simple zero shift correction is not sufficient and it is necessary to introduce a sensitivity multiplying factor C into the correction of the measurement of porosity $\phi_N$.

This factor C is made to vary step by step, for example in steps equal to 0.1, between the values $0.7 \, C_o$ and $1.4 \, C_o$ with $$C_o = \sqrt[n]{\frac{R_{waD}}{R_{waN}}}.$$

A first value of the matrix density $\rho'_{maN(j)}$ is calculated by the formula:

$$\rho'_{maN(j)} = \frac{\rho_{bc} - C \cdot \phi_N \cdot \rho_{mf}}{1 - C \cdot \phi_N} \quad (12')$$

The value $\rho'_{maN(j)}$ depends on the values of $d\rho_b$ and C.

All the levels j are still considered and we calculate the function $F''_{(j)}$ equal to $+1$ if $\rho'_{maN(j)}$ is between the end matrix densities $\rho_{ma1}$ and $\rho_{ma2}$ and equal to $-1$ in the opposite case.

For each pair of values of C and of $d\rho_b$ we calculate $$\sum_j F''_{(j)}.$$

We note the maximum of $\Sigma$ and the value of C, called $C_m$, which corresponds to this maximum.

We again calculate the matrix density:

$$\rho_{maN(j)} = \frac{\rho_{bc} - \phi_{Nc} \cdot \rho_{mf}}{1 - \phi_{Nc}}$$

with $\phi_{Nc}=C_m(\phi_N+d\phi_N)$. We make $d\rho_b$ and $d\phi_N$ vary step by step. We calculate for each pair of values the $F''_{(j)}$ whose value is equal to $+1$ if $\rho_{maN(j)}$ is between $\rho_{ma1}$ and $\rho_{ma2}$ and to $-1$ in the opposite case. We take the sum of $$\sum_j F''_{(j)}$$

and we note the maximum or maxima of this sum. Generally, we obtain a series of maxima which are aligned. We choose the maximum which corresponds to a pair of values $d\phi_{Nm}$ and $d\rho_{bm}$ closest to $d\phi_N=A$ and $d\rho_b=B$ and we choose these values as shift values to be applied to the measurements of $\phi_N$ and of $\rho_b$.

The corrected measurements thus become:

$\phi_{Nc}=C_m \cdot (\phi_N+d\phi_{Nm})$ $\rho_{bc}=\rho_b+d\rho_{bm}$.

In the case where the study of the sum $$\sum_j F_{(j)}$$

is not allowed a very clear maximum to be found, we select the levels j' which lead to $F_{(j')}=+1$ when the estimated value $R_w'$ is given to $R_w$.

We then look for the pair of values of $d\rho_b$ and $d\phi_N$ which optimize the function $$\sum_j F''_{(j')}$$

with $F''_{(j')}$ equal to $\pm 1$ depending on whether the value of $\rho_{maN(j')}$ calculated by the formula (12) is located between $\rho_{ma1}$ and $\rho_{ma2}$ or not.

A family of maxima is generally obtained.

If a sufficiently reliable value of $R_w$ is known, we choose $R_{waN}=R_w$, then the value $d\phi_{Nm}$ which, associated with $R_w$, leads to the maximum of $$\sum_i F_{(i)}$$

and then the value $d\rho_{bm}$ which, assoicated with $d\phi_{Nm}$, leads to the maximum of $$\sum_j F''_{(j)}.$$

A correction $d\rho_b$ greater than 0.05 is improbable. If higher values are found, we choose a correction $d\rho_{bm}=0.05$ and the corresponding correction $d\phi_{Nm}$.

In the case where, during stage II, a calibration has been made in the low-porosity formations, the corrections $d\phi_N$ and $d\rho_b$ are smaller and we limit the search for optima by varying $\Delta\rho_b$ and $\Delta\phi_N$ step by step between ±0.02 only.

Once these calibratons have been made, we know an approximate value of $R_{wa}$ which is the value $R_{waN}=R_{waD}$ corresponding to the values of $\phi_{N\,cor}$ and $\rho_{b\,cor}$.

We recalculate the values of $\rho_{maa}$ of all the most argilaceous levels, using the corrected values of $\phi_N$ and of $\rho_b$. We determine the maximum value $\rho_{ma\,max}$ of this set of values.

The corresponding level is considered to be composed of pure clay if $\rho_{ma\,max}>3.1$ or if the corresponding value of $M<0.60$.

If the value of $\rho_{ma\,max}$ is higher than 2.90, we calculate the clay content $V_{Cl}$ interpolation and then the clay parameters $\phi_{NCl}$, $\Delta t_{Cl}$, etc., in each given interval of 250 feet, as described earlier.

Figure 9:
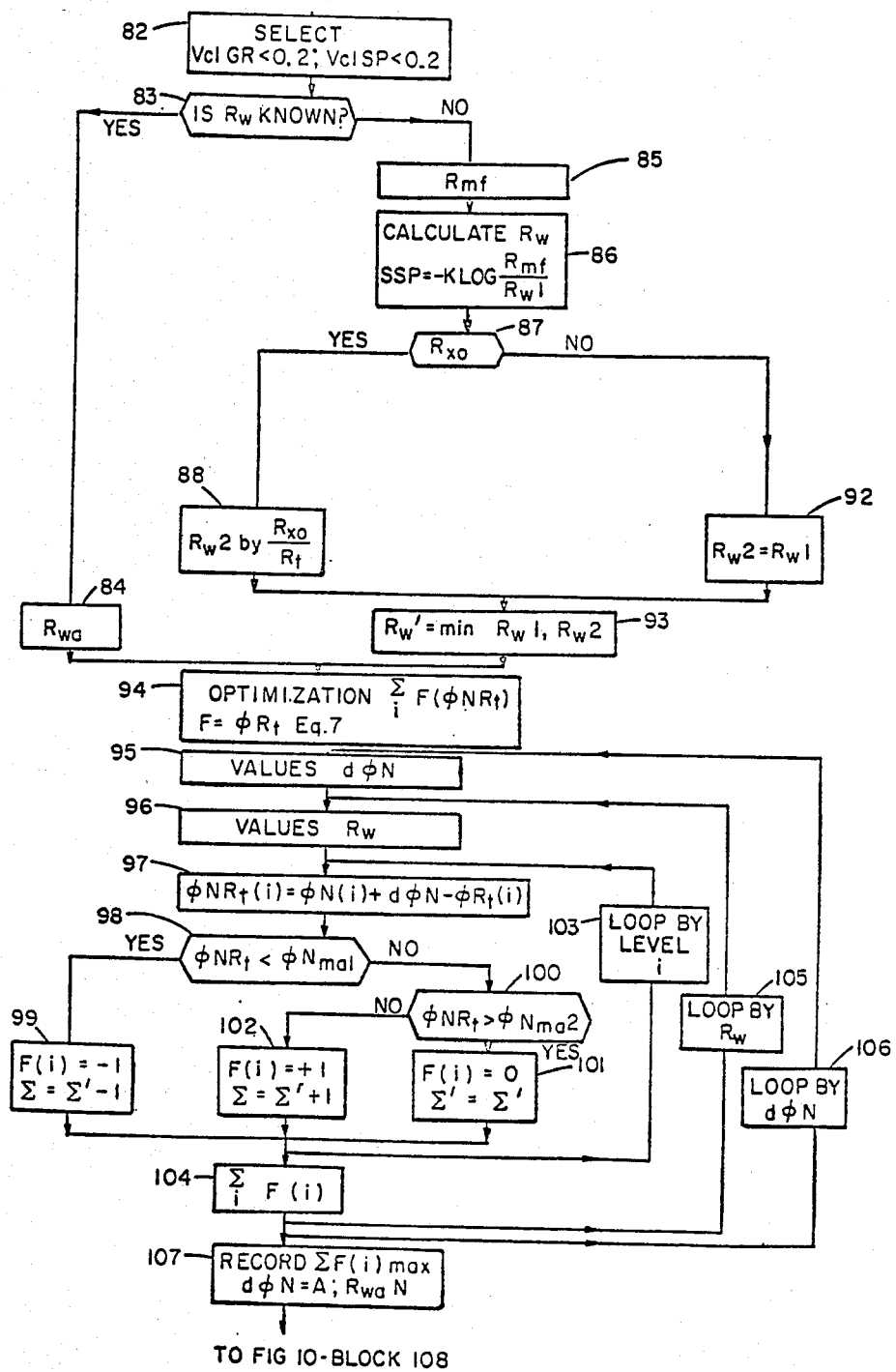
Figure 10:
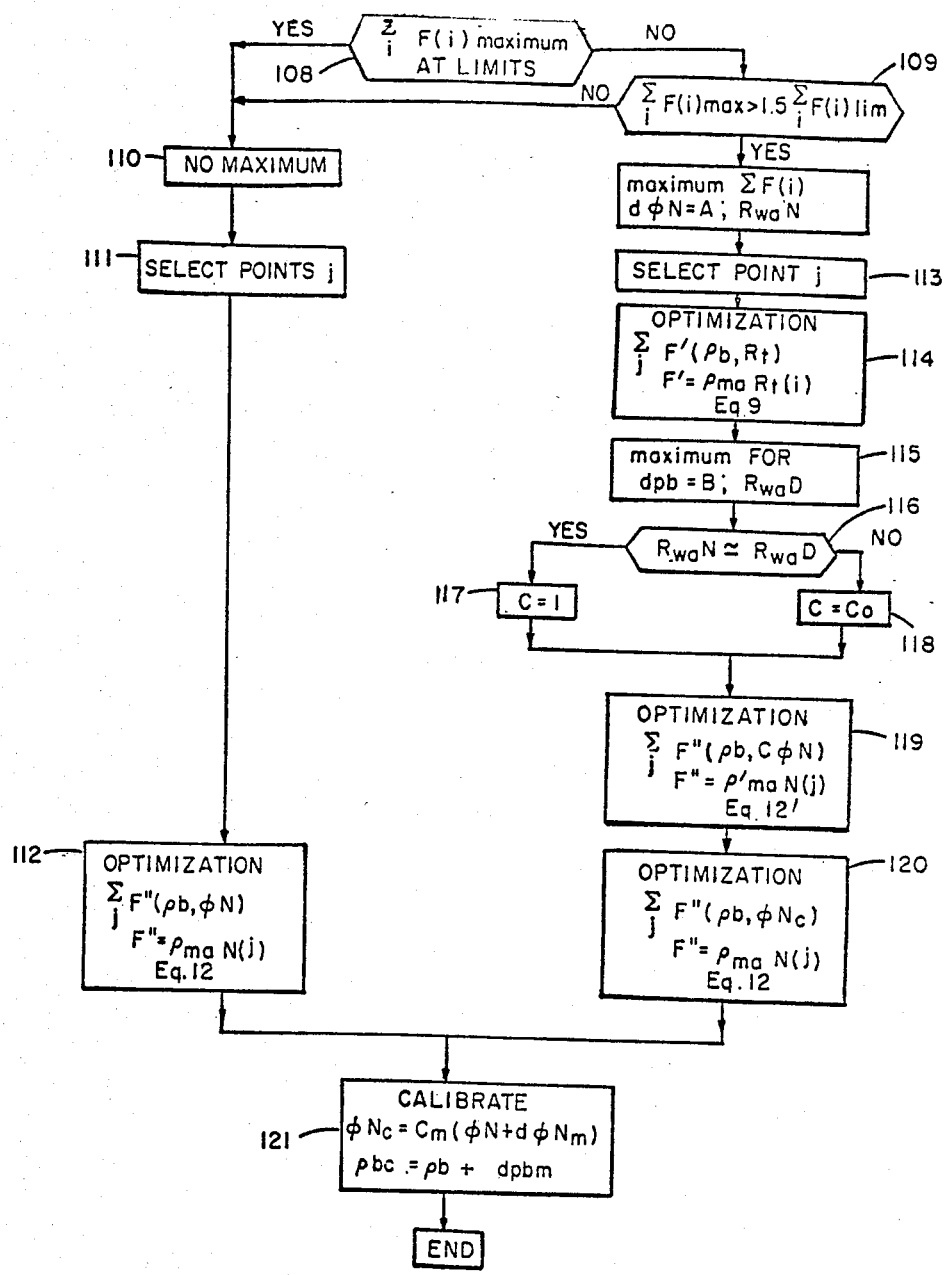

FIGS. 9 and 10 represent the flow chart of the operations of stage IV.

Block 82 represents the selection of the low-clay levels for which the clay proportions $V_{Cl\,GR}$ and $V_{Cl\,SP}$ computed in phase III$_3$ are lower than 0.2.

Block 83 determines whether a value of $R_w$ appears among the initial data.

If the affirmative, this value $R_{wa}$ is recorded (block 84). If no approximate value is known, one is computed.

We read the value of $R_{mf}$ appearing in the initial data (block 85).

Block 86 represents the computation of the first approximate value $R_{w1}$ from SSP.

Block 87 determines whether we have a measurement of $R_{ox}$. If we do, we compute a second approximate value $R_{w2}$ from the maximum of the ratio $R_{xo}/R_t$ according to the formula (24) (block 88).

If we have no measurement of $R_{xo}$, we choose $R_{w2}=R_{w1}$ (block 92).

Finally, we take as an approximate value $R_w'$ the smallest of the values $R_{w1}$ and $R_{w2}$ (block 93).

Block 94 represents the beginning of the computation of the optimization function $F(\phi_N R_{t(i)})$.

Block 95 represents the series of values of $d\phi_N$ located on either side of zero.

Block 96 represents the series of values of $R_w$ located on either side of $R_w'$ or $R_{wa}$, $kR_w'$.

Block 97 represents the calculation of the function $\phi_N R_{t(i)} = \phi_{N(i)} + d\phi_N - \phi R_{t(i)}$ for a level (i) and a pair of values of $d\phi_N$ and of $kR_w'$.

Block 98 compares $\phi_N R_t$ with $\phi_{N\,ma1}$ which is known. If $\phi_N R_t < \phi_{N\,ma1}$, $F_{(i)}=-1$ and the partial sum $\Sigma=\Sigma'-1$, $\Sigma'$ being the preceding value of the partial sum (block 99).

If $\phi_N R_t > \phi_{N\,ma1}$ the block 100 determines whether $\phi_N R_t > \phi_{N\,ma2}$. If such is the case, $F_{(i)}=0$ and $\Sigma=\Sigma'$ (block 101). If not, $F_{(i)}=+1$ and $\Sigma=\Sigma'+1$ (block 102).

The program is pursued by a loop 103. When this loop is completed, we obtain the sum $$\sum_i F_{(i)}$$

(block 104) corresponding to a pair of values of $kR_w'$ and $d\phi_N$.

The program is then pursued by a loop 105 making it possible to process successively all the values of $R_w$ without modifying $d\phi_N$. A new loop 106 then makes it possible to process successively all the values of $d\phi_N$.

Finally, we record (block 107) the maximum value $$\sum_i F_{(i)}$$

max and the values $d\phi_N = A$ and $R_{waN}$ which correspond to this value.

The rest of the program is shown in FIG. 10.

Block 108 determines whether the maximum value of $$\sum_i F_{(i)}$$

corresponds to an end value of the set of values of $R_w$ or the set of values of $d\phi_N$.

If not, block 109 determines whether the maximun value $$\sum_i F_{(i)}$$

max is higher than one and a half times the largest of the values of $$\sum_j F_{(i)}$$

corresponding to the end values of $R_w$ or of $d\phi_N$.

If the reply of block 108 is affirmative or if the reply of block 109 is negative, there is no sufficiently clear maximum (block 110). In this case, we selected the levels j which correspond to $F_{(j)}=+1$ (block 111).

For this set of points, we study the optimization of the function $$\sum_j F'(\rho_b,\phi_N)$$

(block 112). This is carried out as in blocks 94–107 (FIG. 9) with $F''=\rho_{ma}\,N_{(j)}$ (Eq. 12).

In the case where a clear maximum of the function $F_{(i)}$ has been found corresponding to the values $d\phi_N=A$ and $R_{waN}$ which are not limit values, we selected the levels j for which $F_{(j)}=+1$ when $d\phi_N=A$ and $kR_w'R_{waN}$ (block 113).

Block 114 represents the optimization calculations for the function $$\sum_j F'(\rho_b,R_t).$$

This procedure is carried out in a manner similar to that for obtaining the maximum of the function $F=QR_t$ (Eq. 7 as represented by blocks 94 and 107. The function F' is computed using Eq. 9 as a function of $R_w$ and $d\rho_b$. Values of $R_w$ and $d\rho_b$ are varied and the function $F'_{(j)}$ is assigned a value of +1 or −1 dependent upon the relationship between $\rho_{ma} R_{t(j)}$ and $\rho_{ma}$, and $\rho_{ma2}$. For each of the pairs of values, $$\sum_j F_{(j)}$$

is the sum for all the levels, j, selected.

Block 115 represents the results of these calculations which lead to a maximum of $$\sum_j F_{(j)}$$

for a pair of values $d\rho_b = B$ and $R_{waD}$.

Block 116 represents the comparison of $R_{waN}$ and $R_{waD}$. If these values are not very different, for example less than ±15%, it is possible to make a simple calibration of $\phi_N$ by a scale shift. The multiplying coefficient C=1 (block 117).

If, on the other hand, $R_{waN}$ and $R_{waD}$ are very different, it is necessary to introduce into the calibration of $\phi_N$ a sensitivity coefficient C which is chosen to vary between 0.7 $C_o$ and 1.4 $C_o$ with $C_o = \sqrt{R_{waN}/R_{waD}}$.

$$C_o = \sqrt[n]{R_{waN}/R_{waD}}.$$

Block 119 represents the optimization of the function $$\sum_j F'(\rho_b, C \cdot \phi_N)$$

whose calculations are identical to those described for the optimization of the function $$\sum_i F_{(i)}.$$

This calculation furnishes the value of the multiplication coefficient $C_m$.

Block 120 likewise represents the optimization calculations for the function $$\sum_j F''(\rho_b, \phi_{Nc})$$

in which $\phi_{Nc}$ is given values equal to $C_m(\phi_N + d\ \phi_N)$ and $d\ \phi_N$ and $d\ \rho_b$ are varied.

Finally, we determine the calibration coefficients $C_m$, $d\ \phi_m$ and $d\ \rho_{bm}$ and the corrected measurements of $\phi_{Nc}$ and of $\rho_{bc}$ which are used for the subsequent operations are:

$$\phi_{Nc} = C_m \cdot (\phi_N + d\ \phi_N)$$

$$\rho_{bc} = \rho_b + d\ \rho_{bm}$$

in which $\phi_N$ and $\rho_b$ represent the values read on the logs (block 121).

In conclusion, the present invention relates to methods for processing information obtained by well logging consisting of processing operations preliminary to the operations described in earlier patent filings.

These methods make it possible to obtain values of the clay parameters and of the clay content, and to make a first calibration of measuring instruments for porosity $\phi_N$ and for density $\rho_b$.

Of course, the calculation methods described can be replaced by other equivalent methods without leaving the scope of the invention.

While there has been described what is at present considered to be a preferred embodiment of this invention, it will be obvious to those skilled in the art that various changes and modifications may be made therein without departing from the invention, and it is, therefore, intended to cover all such changes and modifications as fall within the true spirit and scope of the invention.

What I claim is:

1. A machine method for exploring subsurface earth formations within the earth formation surrounding a borehole formed in the earth formation by probing a plurality of depth levels of such subsurface earth formation with one or more signals produced in an investigating device adapted to be suspended in said borehole and acquiring and analyzing signals responsive to said probing signals, comprising the steps of:
   (a) providing electrical signals representative of formation characteristics over a plurality of depth levels of the borehole, said electrical signals being derived from signals responsive to the reaction of the subsurface earth formation to probing signals emitted into said subsurface earth formation surrounding the borehole from a source of said probing signalings located in said investigating device;
   (b) combining at least some of said electrical signals to compute at least two parameters related to the amount of clay in the formation;
   (c) determining, by means of the said parameters, the most argilaceous level of each of said intervals;
   (d) selecting from all the most argilaceous levels of each interval the best one, called the pivot level; and
   (e) computing on the basis of electrical signals representative of formation characteristics of the pivot level, clay parameters valid for the entire interval in which said pivot level is located.

2. The method of claim 1 wherein the step of selecting the pivot levels comprises:
   (a) computing all the apparent matrix densities, $\rho_{maa}$ of each of the most argilaceous levels of each interval, (b) determining the largest apparent matrix density of this set of densities, designated $\rho_{ma\ max}$; and (c) selecting as the pivot level the one which corresponds to $\rho_{ma\ max}$.

3. The method of claim 2 wherein the step of computing the clay parameters for the entire interval in which the pivot level is located, comprises:
   (a) comparing the value of $\rho_{ma\ max}$ with a first predetermined limit; and
   (b) setting the clay parameters of the interval equal to those of the pivot level if $\rho_{ma\ max}$ exceed the first predetermined limit.

4. The method of claim 3 wherein the level corresponding to the maximum apparent matrix density $\rho_{ma\ max}$ is considered to be pure clay if $\rho_{ma\ max} > 3$ or the indicator M is lower than 0.65.

5. The method of claim 2 wherein the step of computing the clay parameters for the entire interval in which the pivot level is located, comprises:
   (a) comparing the value of $\rho_{ma\ max}$ with a first and second predetermined limit;
   (b) computing the clay proportion for the pivot level from the apparent matrix density $\rho_{ma}$ of the rocks constituting the said interval and the apparent matrix density of the clay $\rho_{ma\ Cl}$, by the formula:

$$V_{Cl} = \frac{\rho_{ma\ max} - \rho_{ma}}{\rho_{ma\ Cl} - \rho_{ma}}$$

if the value of $\rho_{ma\ max}$ is lower than the first predetermined limit and higher than a second predetermined limit; and (c) computing the clay parameters for the interval using the parameters for the pivot level.

6. The method of claim 2 further comprising the steps of computing the clay parameters of each of the intervals other than the interval in which the pivot level is located, said further steps comprising:
(a) computing the value of the apparent matrix density of the most argilaceous level $\rho_{ma\ Cli}$ of the said other interval;
(b) comparing the value of $\rho_{ma\ Cli}$ with $\rho_{ma\ max}$; and
(c) setting the values of the clay parameters of the said other interval equal to the values of the parameters of the said most argilaceous level of the interval if the difference between $\rho_{ma\ max}$ and $\rho_{ma\ cli}$ is relatively small.

7. The method of claim 6 wherein the most argilaceous levels of an interval are considered to be pure clay if the apparent matrix density $\rho_{ma\ cli}$ is greater than three and $\rho_{ma\ cli}$ is greater than ($\rho_{ma\ max}-0.05$).

8. The method of claim 2 further comprising the step of computing the clay parameters of each of the intervals other than the interval in which the pivot level is located, said further step comprising:
(a) computing the value of the apparent matrix density $\rho_{ma\ cli}$ of the most argilaceous level of the said other interval;
(b) comparing the value of $\rho_{mai}$ with $\rho_{ma\ max}$;
(c) computing the clay proportion $V_{cli}$ of the most argilaceous level from the apparent matrix density $\rho_{ma}$ of the rocks constituting the said other interval and the apparent matrix density of the clay $\rho_{macl}$ if the difference between $\rho_{ma\ max}$ and $\rho_{ma\ cli}$ is relatively large;
(d) comparing the computed clay proportion with a limit value; and
(e) computing the clay parameters for the interval using the parameters of the most argilaceous level of the interval if the computed clay proportion exceeds said limit value.

9. The method of claim 8 wherein the clay parameters of an interval not containing a level in which the clay content is higher than the said given limit are calculated by interpolating the clay parameters of the intervals located on either side of the said interval.

10. A machine for exploring subsurface earth formations within a subsurface earth formation surrounding a borehole formed in said subsurface earth formation by probing said subsurface earth formation with one or more signals produced by tools adapted to be suspended in said borehole and acquiring and analyzing signals responsive to said probing signals, comprising the steps of:
(a) providing electrical signals representative of formation characteristics over a plurality of depth levels of the borehole, said electrical signals being derived from signals responsive to the reaction of said subsurface earth formation to probing signals emitted into said subsurface earth formation surrounding the borehole from a source of probing signals located in said investigating device;
(b) combining at least some of said electrical signals to compute at least two parameters related to the amount of clay in the formation;
(c) determining by means of the said parameters the least and the most argilaceous levels for each interval;
(d) determining from the values of the natural gamma radioactivity GR for the least argilaceous levels the lowest of the value of natural gamma radiation, $GR_{min}$;
(e) determining from the values $GR_{max}$ and $GR_{min}$ reference values of GR in the argilaceous formations $GR_{cl}$ and in the clean formations $GR_o$; and
(f) computing a value of clay content for selected depth levels using the values of $GR_{cl}$ and $GR_o$.

11. The method of claim 10 wherein the clay parameters are at least some of the following parameters:
(a) the natural radioactivity, GR;
(b) the spontaneous potential SP;
(c) the product $GR.\phi N$;

(d) $\rho_{maa} = \frac{\rho_b - N \cdot \phi_f}{1 - \phi_N}$;

(e) the ratio $N' = \frac{3.05 - \rho_b}{\phi_N + 0.20}$;

(f) the ratio $M = \frac{\Delta t_f - \Delta t}{100(\rho_b - \rho_{mf})}$;

(g) the ratio $M' = \frac{100(3.05 - \rho_b)}{\Delta - 20}$; and (h) the maximum diameter of the borehole in clay.

12. The method of claim 10 further comprising the steps of:
(a) selecting sections of the borehole in which GR remains statistically stable over a pre-selected depth interval; and
(b) determining if the stable value is approximately equal to $GR_{min}$, and if it is, setting a parameter $GR_o$ representative of the natural radioactivity in a clean formation equal to the stable value.

13. The method of claim 11 wherein the value of the natural gamma radioactivity in the clean formations is chosen as the value $GR_{min}$ if there is no stable value of GR sufficiently close to $GR_{min}$.

14. The method of claim 10 further comprising the steps of:
(a) selecting sections of the borehole in which GR remains statistically stable over a pre-selected depth interval; and
(b) determining if this stable value is approximately equal to $GR_{max}$, and if it is, setting a parameter $GR_{cl}$ representative of the natural radioactivity in the clay equal to the stable value.

15. The method of claim 14 wherein the value of the natural gamma radioactivity in the argilaceous formations is chosen as the value of $GR_{max}$ if there is not stable GR value sufficiently close to $GR_{max}$.

16. The method of claim 10 further comprising the steps of:
(a) determining the clay content of each level from the measurements of spontaneous potential by:

(1) determining the sections in which the measurement of spontaneous potential, SP, remains substantially constant;
(2) computing for these sections the matrix density maa;
(3) comparing this density with the density of clay $\rho_{ma\ Cl}$; and
(4) setting the value of SP to be the value of SP in the clay, $SP_{Cl}$, if the difference is close to zero and if the clay proportion $V_{Cl\ GR}$ calculated from GR is greater than 50%.

17. The method of claim 16 further comprising the step of determining from the values of $SP_{Cl}$, minimum values of SP for each depth level in the formation.

18. The method of claim 17 further comprising the step of determining the value of the spontaneous potential in the clean formations by the steps of:
(a) comparing the density $\rho_{maa}$ and the density $\rho_{ma\ Cl}$ of the clay and accepting levels wherein the difference is greater than 0.3;
(b) computing the clay proportion $V_{Cl}$ from the measurement of the natural radioactivity GR and accepting levels where $V_{Cl(GR)}$ is smaller than 20%, and
(c) determining the deviation between the spontaneous potential and the minimum value of the spontaneous potential and accepting levels where the deviation is negative and less than $-30$ mV.

19. A machine method for exploring subsurface earth formations within the earth formation surrounding a borehole formed in the earth formation by probing a plurality of depth levels of such subsurface earth formation with one or more signals produced in an investigating device adapted to be suspended in said borehole and acquiring and analyzing signals responsive to said probing signals, comprising the steps of:
(a) providing electrical signals representative of formation characteristics over a plurality of depth levels of the borehole, said electrical signals being derived from signals responsive to the reaction of the subsurface earth formation to probing signals emitted into said subsurface earth formation surrounding the borehole from a source of said probing signalings located in said investigating device;
(b) combining at least some of said electrical signals to compute at least two parameters related to the amount of clay in the formation;
(c) computing for each of the said parameters, the mutual correlation coefficient with each of the other parameters;
(d) computing the sum of the absolute values of the correlation coefficients with each of the other parameters; and
(e) selecting as clay indicators, at least the two parameters which correspond to the highest sum.

20. The method of claim 19 wherein additional clay indicators are selected as the parameters whose correlation coefficient with at least one of the two selected indicators has an absolute value higher than 0.6.

21. The method of claim 19 further comprising the steps of:
(a) selecting one of the two parameters chosen having the highest sum of the absolute values of the correlation coefficients as a pivot parameter; and
(b) assigning a positive sign to the value of the pivot parameter if it is a parameter having a maximum value in the clays, and a negative sign in the opposite case, with the polarity of the spontaneous potential in the clays having the same sign as the product of the sign of the pivot parameter multiplied by the correlation coefficient between the spontaneous potential SP and the pivot parameter.

22. A machine method for exploring subsurface earth formations within the earth formation surrounding a borehole formed in the earth formation by probing a plurality of depth levels of such subsurface earth formation with one or more signals produced in an investigating device adapted to be suspended in said borehole and acquiring and analyzing signals responsive to said probing signals, comprising the steps of:
(a) providing electrical signals representative of formation characteristics over a plurality of depth levels of the borehole, said electrical signals being derived from signals responsive to the reaction of the subsurface earth formation to probing signals emitted into said subsurface earth formation surrounding the borehole from a source of said probing signalings located in said investigating device;
(b) combining at least some of said electrical signals to compute at least two parameters related to the amount of clay in the formation;
(c) determining, the most argilaceous level and the least argilaceous level of each interval as follows:
(1) determining for each clay parameter in the interval a variation range equal to the difference between the statistical maximum and minimum of the parameters in the interval;
(2) dividing this variation by a normalization coefficient to obtain comparable normalized variations for the different clay parameters;
(3) computing for each of the levels in the interval, a function related to the argilaceous level using the said normalized variations; and
(4) determining the levels at which this function is optimum, said levels corresponding to the most and least argilaceous level in the interval.

23. The method of claim 22 wherein the steps of determining the statistical maximum and minimum of the clay parameters comprises the steps of:
(a) choosing a function F of the absolute value of the difference between the values of the said parameter $x_i$ and $x_j$ corresponding to two depth levels i and j;
(b) computing for each level i the value of $P_{(i)}$ which is a function of the sum of the values of F when i remains constant and j varies over the depth levels in the interval and the sign of the function, the sign being the same as that of the difference between the parameters, $x_i - x_j$, if the statistical maximum is sought and opposite the sign of this difference if the statistical minimum is sought; and
(c) choosing as the statistical maximum or minimum of the clay parameters which give the function $P_{(i)}$ its maximum value.

24. The method of claim 23 wherein the function F is chosen as:

$$F = \frac{1}{1 + \alpha |x_i - x_j|^n}$$

in which $\alpha$ is a positive coefficient and n a positive exponent and $x_i$ and $x_j$ represent the values of the parameter of the depth levels i and j respectively.

25. The method of claim 22 wherein the normalization coefficient Nk of the variation of each clay indicator is computed by the following steps:

(a) setting for each of the parameters k a minimum value λ k of a variation range Dk and a number n of variation units to this minimum value which corresponds;
(b) comparing Dk to λ k;
(c) setting the absolute value of the normalization coefficient Nk equal to the quotient of the variation range Dk divided by the number of variation units n, namely $$|Nk| = \left|\frac{Dk}{n}\right|$$

if Dk is greater than or equal to λ k; and
(d) assigning a positive sign to Nk if the clay indicator has a maximum value in the clay and a negative sign if the clay indicator has a minimum value in the clay.

26. The method of claim 25 wherein the most argilaceous level of an interval is the level, i, which gives a maximum value to the function $P_{(i)}$ for which the sign (i,j) is given values as follows:

$$+1 \text{ if } \frac{xk(i) - xk(j)}{Nk} > 0 \text{ for every indicator } k;$$

$$0 \text{ if } \frac{xk(i) - xk(j)}{Nk} < 0 \text{ for a single indicator } k;$$

$$-1 \text{ if } \frac{xk(i) - xk(j)}{Nk} < 0 \text{ for several indicators } k.$$

27. The method of claim 25 wherein the least argilaceous level of an interval is the level, i, which gives a maximum value to the function $P_{(i)}$ for which sign (i,j) is given values as follows:

$$+1 \text{ if } \frac{xk(i) - xk(j)}{-Nk} > 0 \text{ for every indicator } k;$$

$$0 \text{ if } \frac{xk(i) - xk(j)}{-Nk} < 0 \text{ for a single indicator } k;$$

$$-1 \text{ if } \frac{xk(i) - xk(j)}{-Nk} < 0 \text{ for several indicators } k.$$

28. The method of claim 22 further including the step of:
(a) setting for each of the parameters k a minimum value λ k of a variation range Dk and a number n of variation units to which this minimum value corresponds;
(b) comparing Dk to λ k;
(c) setting the absolute value of the normalization coefficient Nk equal to the quotient of the minimum λ k divided by the number of variation units n, namely $$|Nk| = \left|\frac{\lambda k}{n}\right|$$

if Dk is less than λ k.

29. The method of claim 22 wherein the step of determining the most and least argilaceous levels comprises the steps of:
(a) choosing a function $F_{(i,j)}$ of the sum of the absolute values of the normalized variations of all the clay indicators k for two levels i and j, of the form;

$$F = \frac{1}{1 + a \sum_{k=1}^{n} \left|\frac{xk(i) - xk(j)}{Nk}\right|^n}$$

where $xk_{(i)}$ is the value of clay parameter k at depth level i and $xk_{(j)}$ is the value of the clay parameter k at depth levels; a is a positive coefficient and n a positive exponent;
(b) computing for each level the value of a function, $P_{(i)}$ which is a function of the sum of values of F when i is fixed and j takes on successively all the values of the depth levels in the interval and the value of the sign of the function, sign (i,j); and
(c) selecting the levels which give the function $P_{(i)}$ its maximum value.

30. A machine method for exploring subsurface earth formations within the earth formation surrounding a borehole formed in said subsurface earth formation by probing said subsurface earth formation with one or more signals produced by tools adapted to be suspended in said borehole and acquiring and analyzing signals responsive to said probing signals, comprising the steps of:
(a) providing a plurality of electrical signals representative of the neutron and density derived porosity, $\phi_N$ and $\phi_D$; natural gamma radiation GR, spontaneous potential SP, and the resistivity at a relatively large distance from the borehole and relatively near the borehole, $R_t$
(b) computing the clay content of the formation at various depth levels using the GR and SP measurements;
(c) selecting depth levels for which the computed clay content is less than 20 %;
(d) computing for each of the selected depth levels a first function related to porosity dependent upon a value of water resistivity $R_w$ and a correction to be applied to the neutron porosity measurements;
(e) computing for selected depth levels determined by values of the first function related to porosity and resistivity, a second function dependent upon the value of $R_t$ and a correction to be applied to the density derived porosity measurements; and
(f) optimizing the first and second functions to obtain values for use in correcting the porosity measurements.

31. The method of claim 30 further comprising the following steps:
(a) combining at least some of the measurements to produce values of the static spontaneous potential, SSP, of the formation;
(b) computing a first approximate value $R_{w1}$ of resistivity of the formation water from the values of SSP;
(c) computing a second approximate value $R_{w2}$ of the resistivity of the formation water from the maximum value of the ratio of $R_{xo}$ to $R_t$; and
(d) selecting as an approximate value $R_w'$ of the resistivity of the formation water the smallest of the two values $R_{w1}$ and $R_{w2}$.

32. The method of claim 31 further comprising the following steps:
(a) computing a plurality of values of a porosity $\phi R_t$, where $\phi R_t$ is given by the formula:

$$\phi R_t = \sqrt[n]{\frac{a \cdot R_w}{R_t}}$$

in which n is an exponent and a is a coefficient, by varying the values of $R_w$ step by step around $R_w'$;

(b) computing a plurality of values of a function $\phi_{NC} = \phi_N + d\phi_N$ by varying the value $d\phi_N$, where $d\phi_N$ is a correction to be applied to the $\phi_N$ measurements;

(c) selecting a pair of values of $R_w = R_{waN}$ and of $d\phi_N = A$ which optimizes a first function dependent upon the difference $\phi_{NC} - \phi R_t$;

(d) computing a plurality of values of a second function dependent upon the difference $d\rho_c$ and $\phi R_t$, where $\rho_{bc} = \rho_b + d\rho_b$ is the correction to be applied to the density derived porosity measurements by varying the values of $d\rho_b$ and $R_w$;

(e) selecting a pair of values $R_w = R_{waD}$ and $d\rho_b = B$ which optimizes the second function; and (f) computing from these values, the values of correction factors to be applied to the neutron and density measurements.

33. The method of claim 32 further comprising the following steps:

(a) computing for selected depth levels, i, the function $\phi_N R_{t(i)} = \phi_{NC} - \phi R_t$ corresponding to a plurality of pairs of values of $R_w$ and $d\phi_N$;

(b) comparing the values of $\phi_N R_{t(i)}$ with the known porosities of the end matrices $\phi_{Nma1}$ and $\phi_{Nma2}$;

(c) computing a function $F_{(i)}$ such that:

$F_{(i)} = -1$ if $\phi_N R_{t(i)} < \phi_{Nma1}$ $F_{(i)} = +1$ if $\phi_{Nma1} < \phi_N R_{t(i)} < \phi_{Nma2}$ $F_{(i)} = 0$ if $\phi_N R_{t(i)} > \phi_{Nma2}$; and (d) computing for each pair of values of $R_w$ and of $d\phi_N$ the sum $$\sum_i F_{(i)}$$

of all selected depth levels i, and selecting the maximum of the set of values of $$\sum_i F_{(i)}.$$

34. The method of claim 33 further comprising the following steps:

(a) selecting all the levels j for which $F_{(i)} = +1$ when $d\phi_N = A$ and $R_w = R_{waN}$;

(b) computing for each of the levels j the matrix density $$\rho_{maRt(j)} = \frac{\rho_{bc} - \phi R_t \cdot \rho_f}{1 - \phi R_t}$$

for a plurality of pairs of values of $d\rho_b$ and $R_w$;

(c) comparing the values of $\rho_{maRt(j)}$ with the known end matrix densities $\rho_{ma1}$ and $\rho_{ma2}$;

(d) computing a function $F'_{(j)}$ such that:

$F'_{(j)} = +1$ if $\rho_{ma1} < \rho_{maRt(j)} < \rho_{ma2}$ $F'_{(j)} = -1$ if $\rho_{ma Rt(j)} < \rho_{ma1}$ or if $\rho_{maRt(j)} > \rho_{ma2}$; and (e) computing, for each pair of values of $R_w$ and of $d\rho_b$, the sum $$\sum_j F'_{(j)}$$

for all selected depth levels, j, and selecting the maximum of the set of values of $$\sum_j F'_{(j)}.$$

35. The method of claim 32 further comprising the following steps:

(a) comparing the values of $R_{waN}$ and $R_{waD}$ and if the difference $R_{waN} - R_{waD}$ is relatively small, computing the matrix density for selected levels j by the formula:

$$\rho_{maN(j)} = \frac{\rho_{bc} - \phi_{Nc} \cdot \rho_f}{1 - \phi_{Nc}}$$

for a plurality of pairs of values of $d\rho_b$ and $d\phi_N$;

(b) comparing the values of $\rho_{maN(j)}$ with the matrix densities $\rho_{ma1}$ and $\rho_{ma2}$;

(c) computing a function $F''_{(j)}$ such that:

$F''_{(j)} = +1$ if $\rho_{ma1} < \rho_{maN(i)} < \rho_{ma2}$ $F''_{(j)} = -1$ if $\rho_{maN(j)} < \rho_{ma1}$ or if $_{maN(j)} > _{ma2}$;

(d) computing for each pair of values of $d\rho_b$ and $d\phi_N$, the sum $$\sum_j F''_{(j)}$$

for all selected depth levels j, and selecting the maxima of the values of $$\sum_j F''_{(j)};$$

and (e) selecting the pair values of $d\phi_{Nm}$ and $d\rho_{bm}$ corresponding to a maximum of $$\sum_j F'_{(j)}$$

which is the closest to $d\phi_N = A$ and $d\rho_b = B$ and correcting the values of $\phi_N$ and $\rho_b$ according to:

$\phi_{Nc} = \phi_N + d\phi_{Nm}$, and $\rho_{bc} = \rho_b = d\rho_{bm}$.

36. The method of claim 32 further comprising the following operations:

(a) comparing the values of $R_{waN}$ and $R_{waD}$ and if the difference $R_{waN} - R_{waD}$ is not relatively small, computing the matrix density for selected levels j by the formula:

$$\rho'_{maN(j)} = \frac{\rho_{bc} - \phi_{Nc}\rho_f}{1 - C\phi_N}$$

for a plurality of pairs of values of $d\rho_b$ and C where C is a correction factor proportional to $$\sqrt[n]{R_{waD}/R_{waN}} \quad ;$$

(b) comparing the values of $\rho'_{maN(j)}$ with the end matrix densities $\rho_{ma1}$ and $\rho_{ma2}$;
(c) computing a function $F''_{(j)}$ such that:

$$F''_{(j)} = +1 \text{ if } \rho_{ma1} < \rho'_{maN(j)} < \rho_{ma2}$$

$$F''_{(j)} = -1 \text{ if } \rho'_{maN(j)} < \rho_{ma1}$$

or if $\rho_{ma2} < \rho'_{maN(j)}$;
(d) computing for each pair of values of $d\rho_c$ and C, the sum $$\sum_j F''_{(j)}$$

for all selected depth levels j and selecting the value $C_m$ which corresponds to the value of C for the maximum of $$\sum_j F''_{(j)};$$

(e) computing at the selected depth levels j the density $$\rho_{maN(j)} = \frac{\rho_{bc} - \phi_{Nc} \cdot \rho_f}{1 - \phi_{Nc}}$$

in which $\phi_{Nc} = C_m \cdot (\phi_N + d\phi_N)$ for pairs of values of $d\phi_N$ and $d\rho_b$;
(f) repeating steps (b), (c) and (d) for $\rho_{maN(j)}$ and selecting the pair of values $d\phi_{Nm}$ and $d\rho_{bm}$ which corresponds to a maximum of $$\sum_j F''_{(j)}$$

and which is closest to $d\phi_N = A$ and $d\rho_b = B$; and
(g) correcting the values of the readings of $\phi_N$ and $\rho_b$ according to $\phi_{Nc} = C_m 1(\phi_N + d\phi_{Nm})$ and $\rho_{bc} = \rho_b + d\rho_{bm}$.

37. The method of claim 32 further comprising the following steps:
(a) computing for selected depth levels, i, the function $\phi_N R_{t(i)} = \phi_{NC} - \phi R_t$ corresponding to a plurality of pairs of values of $R_w$ and $d\phi_N$;
(b) determining from said electrical signals the depth levels corresponding to salt formations; and
(c) computing for the salt levels the statistical minimum of the density $\rho_{b\,min} = 2.03$.

38. The method of claim 32 further comprising the following steps:
(a) computing for selected depth levels, i, the function $\phi_N R_{t(i)} = \phi_{NC} - \phi R_t$ corresponding to a plurality of pairs of values of $R_w$ and $d\phi_N$;
(b) determining from said electrical signals if any depth levels correspond to salt and anhydrite formations;
(c) computing, if there are no anhydrite or salt formations, the statistical minimum of the porosity measurements $\phi_{N\,min}$ and calibrating the porosity measuring instrument so that $\phi_{min} = 3.5$ P.U.

39. A machine method for exploring subsurface earth formations within the earth formation surrounding a borehole formed in the earth formation by probing a plurality of depth levels of such subsurface earth formation with one or more signals produced in an investigating device adapted to be suspended in said borehole and acquiring and analyzing signals responsive to said probing signals, comprising the steps of:
(a) providing electrical signals representative of neutron porosity, bulk density and acoustic travel time and at least some other measurements related to the characteristics of an earth formation over a plurality of depth levels of the borehole, said electrical signals being derived from signals responsive to the reaction of said subsurface earth formation to probing signals emitted into said subsurface earth formation surrounding the borehole from a source of probing signals located in said investigating device;
(b) determining from said electrical signals the depth levels corresponding to anhydrite formations;
(c) computing a statistical maximum $\rho_{b\,max}$ of the set of density measurements in these levels, the statistical minimum of the measurements of porosity $\phi_{N\,min}$ and the statistical minimum of the acoustic transit time $\Delta t_{min}$; and
(d) correcting the density, porosity and acoustic transit time such that $\rho_{b\,max} = 2.98$: $\phi_{N\,min} = 0.5$ P.U. and $\Delta t_{min} = 50$.

40. The method of claim 39 wherein said salt levels are determined as levels where the porosity calculated from the resistivity $R_t$ is lower than 1 porosity unit, the measured density is between 2 and 2.9, and the natural gamma radioactivity GR is lower than or equal to 20 and the acoustic transit time $\Delta t$ is between 65 and 69.

41. A machine method for exploring subsurface earth formations within the earth formation surrounding a borehole formed in the earth formation by probing a plurality of depth levels of such subsurface earth formation with one or more signals produced in an investigating device adapted to be suspended in said borehole and acquiring and analyzing signals responsive to said probing signals, comprising the steps of:
(a) providing electrical signals representative of at least the neutron and density derived porosity and resistivity of the formation of an earth formation over a plurality of depth level of the borehole; said electrical signals being derived from signals responsive to the reaction of said subsurface earth formation to probing signals emitted into said subsurface earth formation surrounding the borehole from a source of probing signals located in said investigating device;
(b) determining from at least some of the electrical signals compact formations other than anhydrite, salt or coal;
(c) computing for said compact formations the porosity $\phi R_t$ and determining therefrom the average $\phi R_t$;
(d) computing the average neutron porosity value in compact formations; and (e) correcting the neutron porosity measurements in accordance with the computed averages.

42. The method of claim 41 further comprising:
   (a) computing the matrix densities of the compact formations, $\rho_{ma}R_t$ using the formation resistivity measurements;
   (b) determining the statistical maximum and minimum of the $\rho_{ma}R_t$ values; and
   (c) calibrating the density measurement instrument if the difference between the statistical maximum and minimum is between 0.15 and 0.17 so that the statistical maximum of $\rho_{ma}R_t$ is equal to the density of the dolomite and that at the same time the statistical minimum is equal to the density of the limestone.

43. The method of claim 42 further comprising the following steps:
   (a) comparing the acoustic transit time $\Delta t$ with predetermined values in the pure minerals, if the difference between the statistical maximum and minimum of the values $\rho_{ma}R_t$ is smaller than 0.05; and
   (b) calibrating the density measurement instrument so that the statistical minimum of $\rho_{ma}R_t = 2.71$ if $\Delta t$ is between 47 and 49.

44. The method of claim 42 comprising the following steps:
   (a) computing the matrix densities of the compact formation $\rho_{ma}R_t$ using the formation resistivity measurement; and
   (b) calibrating the density measuring instrument so that the statistical maximum of $\rho_{ma}R_t = 2.87$ if $\Delta t$ is smaller than 44.

* * * * *